US 9,897,851 B2

(12) United States Patent
Suzuki et al.

(10) Patent No.: US 9,897,851 B2
(45) Date of Patent: Feb. 20, 2018

(54) DISPLAY DEVICE

(71) Applicant: Funai Electric Co., Ltd., Daito, Osaka (JP)

(72) Inventors: Tomokazu Suzuki, Osaka (JP); Makoto Nameda, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 4 days.

(21) Appl. No.: 15/193,820

(22) Filed: Jun. 27, 2016

(65) Prior Publication Data

US 2016/0306228 A1    Oct. 20, 2016

Related U.S. Application Data

(63) Continuation of application No. 14/446,445, filed on Jul. 30, 2014, now Pat. No. 9,389,459.

(30) Foreign Application Priority Data

Aug. 20, 2013    (JP) .................................. 2013-170744

(51) Int. Cl.
   *G02F 1/1335*    (2006.01)
(52) U.S. Cl.
   CPC .. *G02F 1/133605* (2013.01); *G02F 1/133603* (2013.01)
(58) Field of Classification Search
   None
   See application file for complete search history.

(56) References Cited

U.S. PATENT DOCUMENTS

| 9,696,584 B2 * | 7/2017 | Nameda ............ G02F 1/133605 |
| 2005/0265020 A1 | 12/2005 | Kim |
| 2010/0046206 A1 | 2/2010 | Kawada |
| 2014/0092337 A1 | 4/2014 | Kawada |

FOREIGN PATENT DOCUMENTS

| EP | 2157474 A1 | 2/2010 |
| JP | 2011-034947 A | 2/2011 |
| JP | 4903253 B2 | 3/2012 |

OTHER PUBLICATIONS

Extended European Search Report of the corresponding European Patent Application No. 14180856.8, dated Nov. 14, 2014.

* cited by examiner

*Primary Examiner* — Ashok Patel
(74) *Attorney, Agent, or Firm* — Global IP Counselors, LLP

(57) ABSTRACT

A display device includes a display portion, a light source, and a reflector. The reflector reflects light from the light source. The reflector has a rectangular bottom part, first and second peripheral parts that partially extend from first opposing sides of the bottom part, and third and fourth peripheral parts that extend from second opposing sides of the bottom part that are adjacent to the first opposing sides. The first and second peripheral parts and the third and fourth peripheral parts have overlapping regions that overlap each other.

20 Claims, 20 Drawing Sheets

DISPLAY DEVICE

CROSS-REFERENCE TO RELATED APPLICATIONS

This is a continuation application of U.S. patent application Ser. No. 14/446,445, which claims priority to Japanese Patent Application No. 2013-170744 filed on Aug. 20, 2013. The entire disclosures of U.S. patent application Ser. No. 14/446,445 and Japanese Patent Application No. 2013-170744 are hereby incorporated herein by reference.

BACKGROUND

Field of the Invention

The present invention generally relates to a display device. More specifically, the present invention relates to a display device equipped with a reflective sheet for reflecting light from a light source toward a display panel.

Background Information

Display devices are known that are equipped with a reflective sheet for reflecting light from a light source toward a display panel (see Japanese Patent No. 4,903,253 (Patent Literature 1), for example).

Patent Literature 1 discloses a display device equipped with a concave reflective sheet for reflecting the light from the light source toward the display panel.

SUMMARY

The present invention is directed to various features of a display device with a reflective sheet.

One object is to provide a display device having a reflective sheet with which a concave shape of the reflective sheet can be easily maintained, without the use of any reinforcing member, even though the reflective sheet is made thinner. Another object is to provide a display device with which the image is less likely to shake as a result of vibration or impact.

In view of the state of the known technology, a display device includes a display portion, a light source, and a reflector. The reflector reflects light from the light source. The reflector has a rectangular bottom part, first and second peripheral parts that partially extend from first opposing sides of the bottom part, and third and fourth peripheral parts that extend from second opposing sides of the bottom part that are adjacent to the first opposing sides. The first and second peripheral parts and the third and fourth peripheral parts have overlapping regions that overlap each other.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be described through reference to the drawings. It will be apparent to those skilled in the art from this disclosure that the following descriptions of the embodiments are provided for illustration only and not for the purpose of limiting the invention as defined by the appended claims and their equivalents. The constituent elements, the layout positions and connection modes of the constituent elements, and so forth given in the following embodiments are just provided for illustration only and not for the purpose of limiting the invention. The invention is merely defined by the appended claims. Of the constituent elements in the following embodiments, those not discussed in an independent claim are not necessarily required, but will be described for understanding of the embodiments.

First Embodiment

Configuration of Display Device

Figure 1:
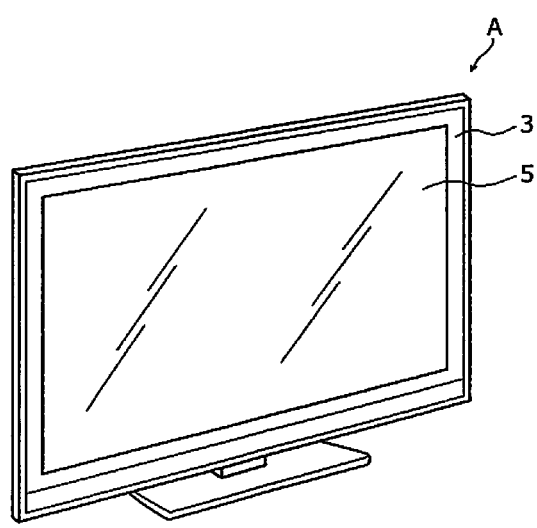
FIG. 1 is a perspective view of a display device in accordance with a first embodiment.
Figure 2:
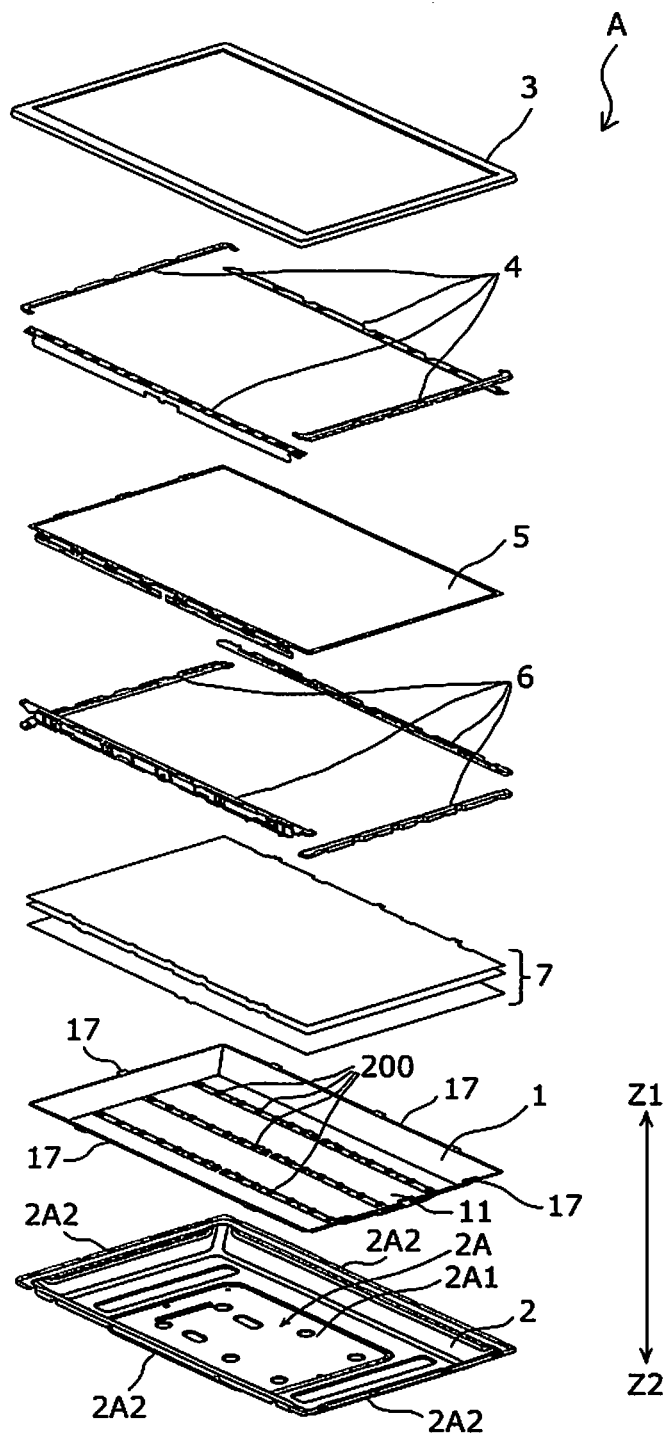
FIG. 2 is an exploded perspective view of the display device illustrated in FIG. 1.

FIG. 1 is a perspective view of a display device A in accordance with a first embodiment. FIG. 2 is an exploded perspective view of the display device A. In FIG. 2, the direction on the forward side is labeled the Z1 direction, and the direction on the rearward side is labeled the Z2 direction.

The display device A includes a front cabinet 3, a plurality of bezels 4, a display panel 5, a molded frame 6, an optical sheet 7, a reflective sheet 1, and a rear frame 2. The front cabinet 3 is a frame-shaped member disposed on the forward side of the display device A. The bezels 4 protect the outer frame of the display panel 5 and are provided along the outer frame. The display panel 5 is a liquid crystal panel, for example, and displays images.

The molded frame 6 is a member that supports the display panel 5 from its rear face side. The optical sheet 7 has a plurality of members, such as a diffuser and a light guide sheet.

The rear frame 2 is a member that serves as the rear housing of the display device A. A recess 2A having a bottom face 2A1 whose size corresponds to a bottom face part 11 of the reflective sheet 1 is formed in the rear frame 2.

The bottom face part 11 of the reflective sheet 1 is disposed on the bottom face 2A1 of the recess 2A via a heat sink or an LED substrate (not shown). Thus, the rear frame 2 functions as a rear face side support member that supports the bottom face part 11 of the reflective sheet 1 from the rear face side.

The rear frame 2 has an outer peripheral part 2A2. Flaps 17 of the reflective sheet 1 overlap the outer peripheral part 2A2.

The reflective sheet 1 is a member that reflects light from LEDs 200 (light emitting diodes; light sources) toward the display panel 5. The flaps 17 that overlap the outer peripheral part 2A2 of the rear frame 2 are formed on the outer peripheral part of the reflective sheet 1. In the illustrated embodiment, the display device A is illustrated as a liquid crystal display device with LEDs. However, the present invention is not limited to this type of display device, and can be applied to a display device having different types of display panels, or having different types of light sources.

Configuration of Reflective Sheet

Figure 3:
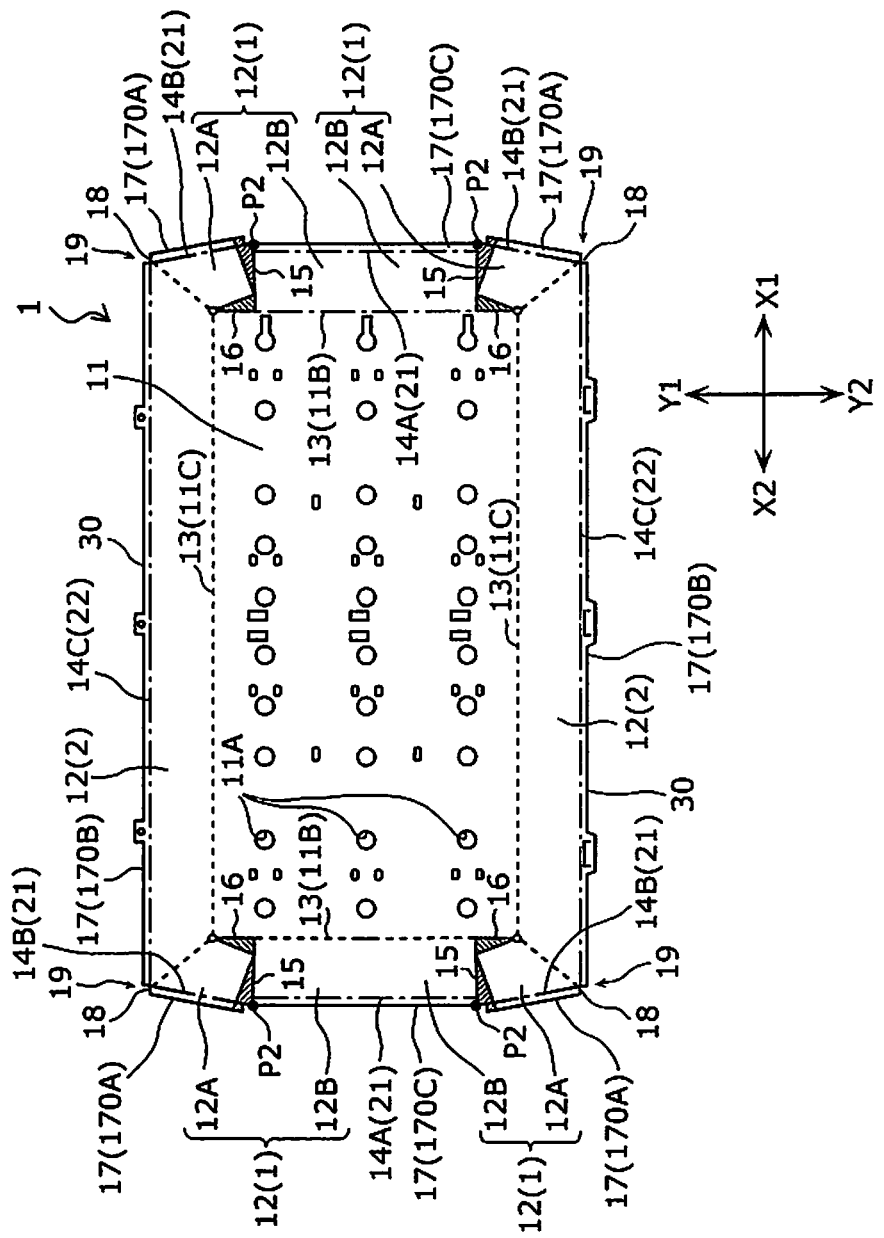
FIG. 3 is a developed view of a reflective sheet used in the display device in accordance with the first embodiment.
Figure 4A:
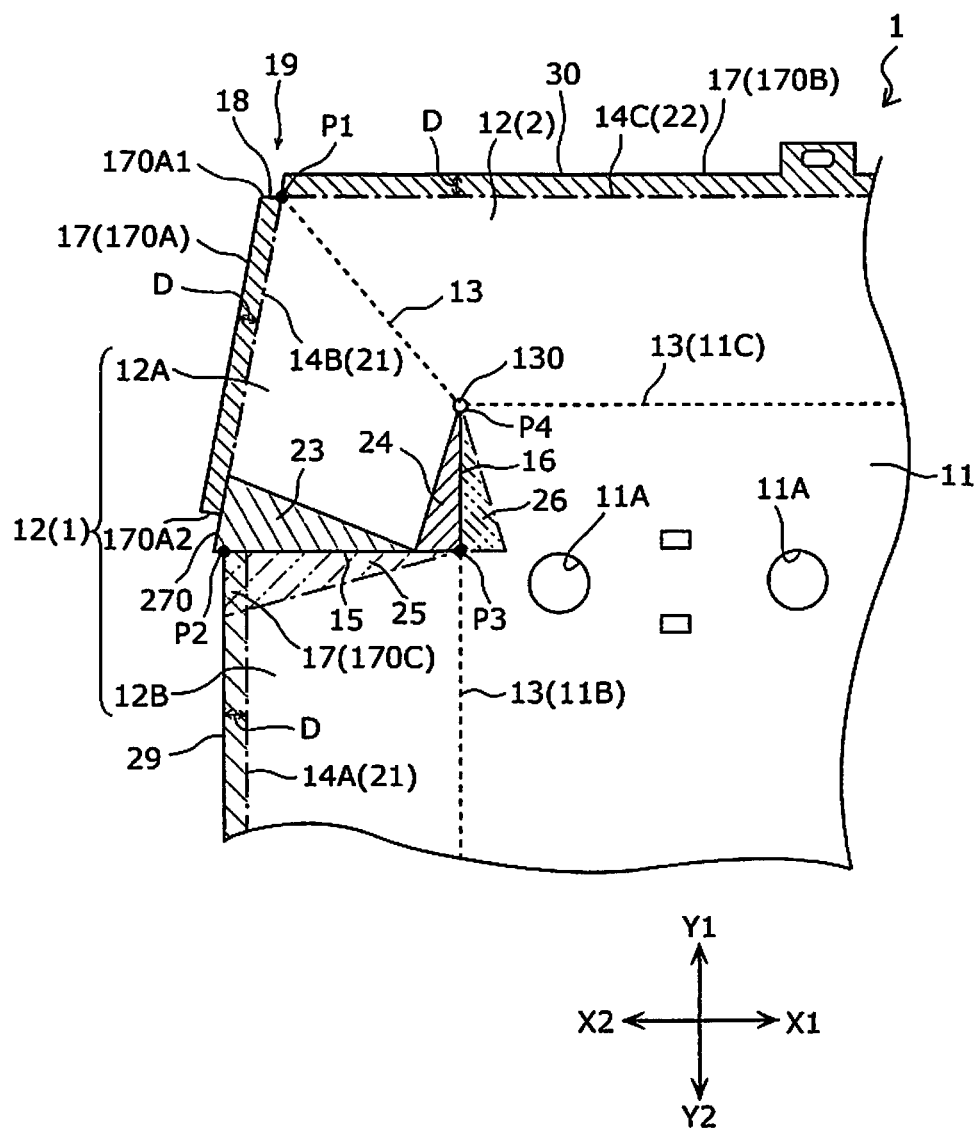
FIG. 4A is a detail view of a corner part of the reflective sheet illustrated in FIG. 3.
Figure 4B:
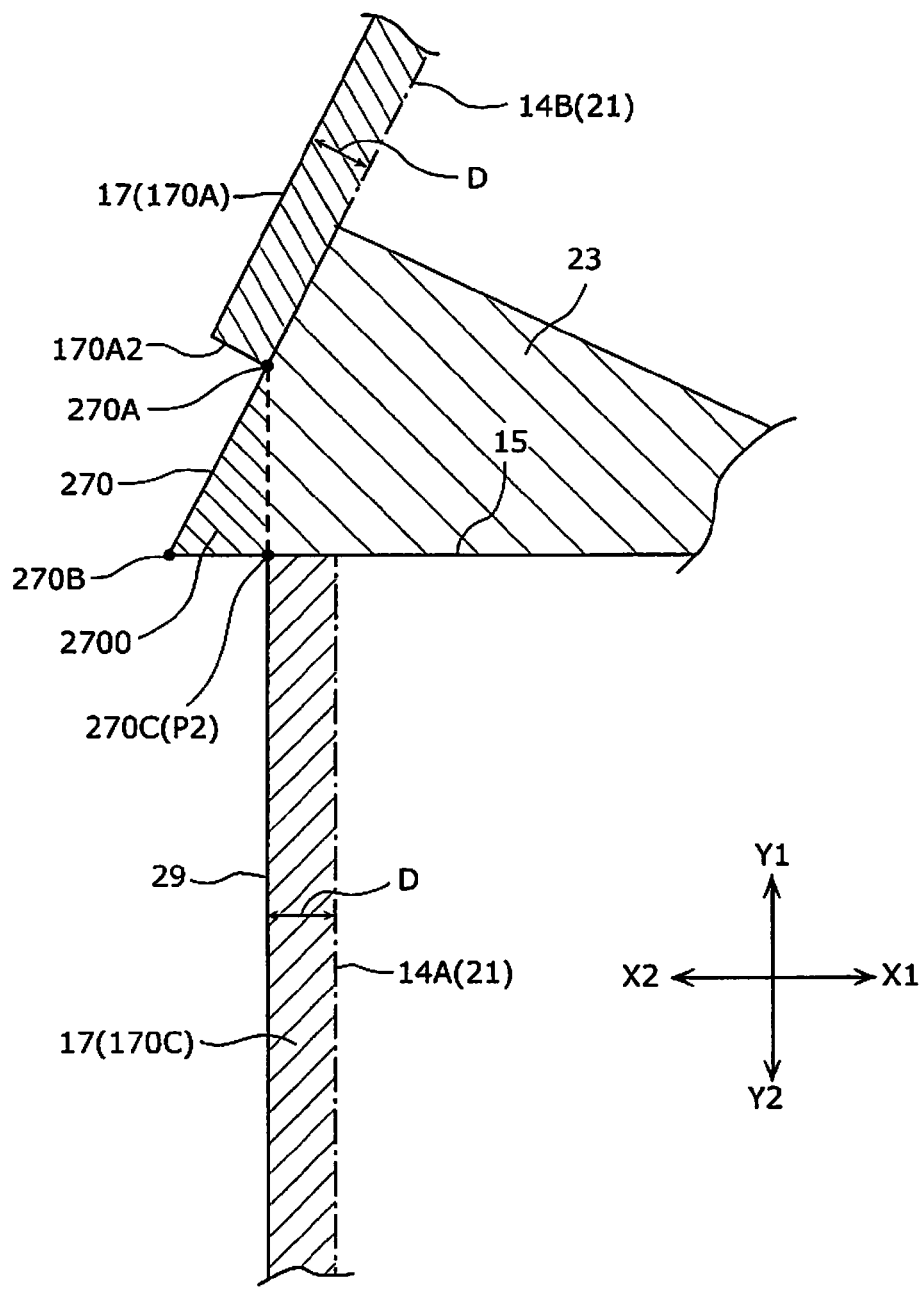
FIG. 4B is a detail view in which the corner part illustrated in FIG. 4A is further enlarged.
Figure 5:
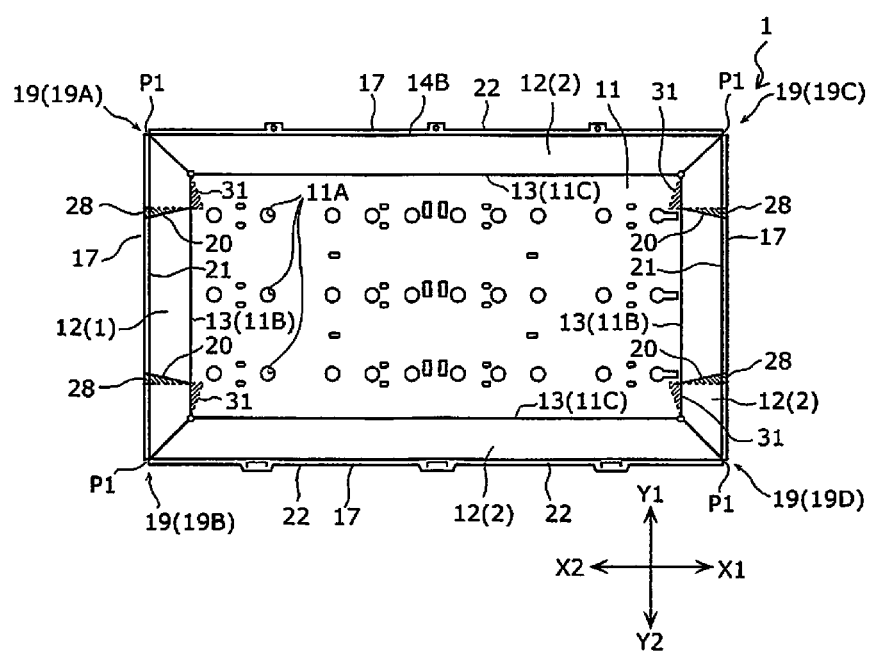
FIG. 5 is an elevational view of the reflective sheet illustrated in FIG. 3 in its assembled state.

FIG. 3 is a developed view of the reflective sheet 1 used in the display device A in accordance with the first embodiment. FIG. 4A is a detail view of a corner part of the reflective sheet 1. FIG. 4B is a detail view in which the corner part in FIG. 4A is further enlarged. FIG. 5 is an elevational view of the reflective sheet 1 in its assembled state.

In FIGS. 3 to 5, the right direction is labeled the X1 direction, the left direction is labeled the X2 direction, the upward direction is labeled the Y1 direction, and the downward direction is labeled the Y2 direction. The corner part shown in FIGS. 4A and 4B is the upper-left corner 19 in FIG. 3. The other corners 19 (the upper-right, lower-left, and lower-right corners 19) have the same configuration as the corner part shown in FIGS. 4A and 4B, and therefore are not depicted or described.

With this reflective sheet 1, a plurality of through-holes 11A through which the LEDs 200 are passed are formed in the bottom face part 11. The reflective sheet 1 has four of the corners 19. A cut-out 18 is formed in each of these four corners 19.

The cut-outs 18 are formed in the reflective sheet 1 as shown in FIG. 4A. By forming these cut-outs 18 an apex P1 is formed while a protruding tab 170A and an end portion 170B contact with each other when the reflective sheet 1 is assembled. As shown in FIG. 4A, at each corners 19, a second perforation 14B (indicated by a one-dot chain line in FIG. 4A) is formed extending from the apex P1 toward the outside with respect to the upward and downward directions (diagonally downward to the left in FIG. 4A). These second perforations 14B form display panel-side edges 21 when the reflective sheet 1 is assembled into a concave shape.

The protruding tabs 170A, which are parallel to the second perforations 14B, are provided near the second perforations 14B. The protruding tabs 170A each have an end portion 170A1 on the apex P1 side, and an end portion 170A2 on the opposite side from the apex P1. Edges 270 are provided on extensions of the second perforations 14B from the end portions 170A2, respectively.

As shown in FIG. 4B, for example, at each corners 19, the edge 270 forms a region 2700 in the form of a right triangle, indicated by hatching going diagonally downward to the right, in the overlapping portion 23 (discussed below). This region 2700 has three apexes 270A, 270B, and 270C. The apex 270C is a point that serves as the starting point of an edge 29 that is parallel in the upward and downward directions. As discussed below, at each corners 19, a first slit 15 is formed using the apex 270C as its starting point P2.

As shown in FIGS. 4A and 4B, at each corners 19, a second perforation 14A (indicated by one-dot chain lines in FIGS. 4A and 4B) is formed at a position that is a width D away from the edge 29. This width D matches how far the protruding tabs 170A protrude from the second perforations 14B. These second perforations 14A are formed parallel to the edges 29, and form the display panel-side edges 21 when the reflective sheet 1 is folded into a concave shape.

As shown in FIG. 4A, with the reflective sheet 1, a pair of second perforations 14C (indicated by a one-dot chain line in FIG. 4A) are also formed, which extend in the horizontal direction between the apexes P1. These second perforations 14C are formed parallel to edges 30, separated by the width D from the edges 30 in the vertical direction. The second perforations 14C form display panel-side edges 22 when the reflective sheet 1 is assembled into a concave shape.

When the second perforations 14A and 14B are mountain folded, they form the display panel-side edges 21, and when the second perforations 14C are mountain folded, they form the display panel-side edges 22. When the second perforations 14A, 14B, and 14C are mountain folded, the regions between them and the end portions of the reflective sheet 1 form the flaps 17.

First perforations 13 (indicated by broken lines) are also formed in the reflective sheet 1. As shown in FIG. 5, when the first perforations 13 are valley folded, this forms one bottom face part 11, a pair of short edge-side side face parts 12(1) that include the short edges 11B of the bottom face part 11, and a pair of long edge-side side face parts 12(2) that include the long edges 11C of the bottom face part 11.

The first perforations 13 on the short edge-side side face parts 12(1) side form the short edges 11B of the bottom face part 11 when the reflective sheet 1 is assembled into a concave shape. The first perforations 13 on the long edge-side side face parts 12(2) side form the long edges 11C of the bottom face part 11 when the reflective sheet 1 is assembled into a concave shape.

Holes 130 are formed in the four corners of the bottom face part 11 so that overlapping portions 24 of first regions 12A (discussed below) will easily go from second slits 16 (discussed below) into the rear of the bottom face part 11 (the side away from the viewer in the drawing).

As shown in FIG. 5, the display panel-side edges 21 each have two apexes P1, P1. As shown in FIG. 4A, at each corners 19, the first slit 15 is formed in the display panel-side edge 21. The starting point of the first slit 15 is a position (in this example, the starting point P2) within a predetermined proximity range of a reference apex (this reference apex is the apex P1), and the first slit 15 extends toward the short edge 11B of the bottom face part 11 and has its end point P3 at the short edge 11B.

As shown in FIG. 3, the first slits 15 divide the short edge-side side face parts 12(1) into a first region 12A that includes the reference apex P1 and a second region 12B that does not include the reference apex P1.

As shown in FIG. 4A, at each corners 19, the second slit 16 is formed extending from the end point P3 of the first slit 15, along the short edge 11B of the bottom face part 11, toward the long edge-side side face part 12(2) on the side closer to the first slit 15 out of the pair of long edge-side side face parts 12(2), with the end point P4 being the hole 130 in the bottom face part 11.

As shown in FIG. 4A, at each corners 19, the first region 12A formed by the first slit 15 has a first overlapping portion 23 that includes the first slit 15 (a predetermined region on the first slit 15 side), and a second overlapping portion 24 that includes the second slit 16 (the end portion of the first region 12A on the second slit 16 side). In FIG. 4A, the first overlapping portion 23 is indicated by hatching going diagonally downward to the right, and the second overlapping portion 24 is indicated by hatching going diagonally downward to the left.

With the reflective sheet 1 with this configuration, in the course of assembly work, as discussed above, the first perforations 13 are valley folded, and the second perforations 14A to 14C are mountain folded. At this point, the holes 130 make it easier for the second overlapping portions 24 of the first regions 12A to go through the second slits 16 and into the rear side of the bottom face part 11 (the side away from the viewer). Thus, the worker puts the second overlapping portions 24 into the rear side of the bottom face part 11 (the side away from the viewer).

After this, the worker brings the first regions 12A formed by the first slits 15 into contact with the surface of the second regions 12B (the side toward the viewer).

Operation

As a result, the first overlapping portions 23 (see FIG. 4A), which are predetermined ranges of the first regions 12A on the first slit 15 side of the first regions 12A, overlap predetermined ranges or regions 25 of the second region 12B on the first slit 15 side of the second regions 12B (the region indicated by two-dot chain line hatching; see FIG. 4A). Consequently, as shown in FIG. 5, overlapping parts 20 are formed where the overlapping portions 23 overlap the regions 25.

Also, the second overlapping portions 24 (see FIG. 4A), which are predetermined ranges of the first regions 12A on the second slit 16 side of the first regions 12A, overlap predetermined regions 26 of the bottom face part 11 (the region indicated by two-dot chain line hatching; see FIG. 4A). Consequently, as shown in FIG. 5, overlapping parts 31 are formed where the overlapping portions 24 overlap the regions 26. Thus having the overlapping portions 24 overlap the regions 26 results in the overlapping portions 24 of the first regions 12A being supported by the second slits 16.

Furthermore, as shown in FIG. 4A, because the overlapping portions 23 of the first regions 12A overlap the regions 25 of the second regions 12B, the protruding tabs 170A and the end portions 170C of the second regions 12B overlap each other. This forms overlapping portions 28 in which the flaps 17 overlap each other.

Effect

With the above configuration, the overlapping portions 24 of the first regions 12A overlap with the regions 26 of the bottom face part 11. Thus, the first regions 12A are less likely to waver. Therefore, the overlapping portions 23 of the first regions 12A can overlap the regions 25 of the second regions 12B more securely. Consequently, the stiffness of the short edge-side side face parts 12(1) becomes higher.

As a result, a reflective sheet can be provided with which the concave shape of the reflective sheet can be more easily maintained, without the use of any reinforcing member even though the reflective sheet is made thinner, and the image is less likely to shake as a result of vibration or impact, without increasing the developed surface area.

Also, the second slits 16 are formed starting at the starting point P3 of the first slits 15, along the short edges 11B of the bottom face part 11, and toward the long edge-side side face parts 12(2) on the side of the first slits 15 closer to the end point P3. Thus, the second slits 16 can be shorter in length.

Therefore, as discussed above, unlike when the second slits 111 are formed in the entire vertical direction of the bottom face part 11, there will be less increase in the developed surface area. Thus, the stiffness of the short edge-side side face parts 12(1) can be increased.

Furthermore, as discussed above, the overlapping portions 28 are formed where the flaps 17 overlap each other. Consequently, there is an increase in the thickness of part of the flaps 17. Thus, the shape of the flaps 17 can be stabilized.

Position of Reference Apex within Proximity Range

The position of the apex (reference apex) P1 within the proximity range is preferably a position that does not reach the center portion along the display panel-side edges 21 from the apex P1, and more precisely, is near the end portions 170A2 of the protruding tabs 170A, out of the edges 270 formed by the extension of the protruding tabs 170A (see FIGS. 4A and 4B).

In other words, the position can be such that there is no loss of the concave shape of the reflective sheet 1 even though the overlapping portions 23 and 24 overlap the regions 25 and 26 within a range from the apex P1 to a position that does not reach the center part of the short edge-side side face parts 12(1).

Other

In the illustrated embodiment, only the upper-left corner 19A is described above. However, the overlapping parts 20 and 31 and the overlapping portions 28 of the flaps 17 are also formed by the method discussed above for the lower-left corner 19B, the upper-right corner 19C, and the lower-right corner 19D.

Thus, the operation and effect obtained with the lower-left corner 19B, the upper-right corner 19C, and the lower-right corner 19D are the same as those obtained with the above-mentioned upper-left corner 19A.

In particular, as shown in FIG. 5, since two of the overlapping parts 20 are formed at the short edge-side side face parts 12(1), the stiffness of the short edge-side side face parts 12(1) will be higher than when there is only one overlapping part 20.

In the illustrated embodiment, the display device A includes the display panel 5, the LED 200 (e.g., the light source), and the reflective sheet 1. The LED 200 (e.g., the light source) is configured to emit light from a rear side relative to the display panel 5 toward the display panel 5. The reflective sheet 1 is disposed on the rear side relative to the display panel 5, and is configured to reflect the light from the LED 200 (e.g., the light source) toward the display panel 5. The reflective sheet 1 includes the four-sided bottom face part 11 with two pairs of mutually opposing edges 11B, 11C (e.g., sides), the second region 12B (e.g., the first peripheral portion) extending from the short edge 11B (e.g., one of the sides) of the bottom face part 11, and the second peripheral portion (12A, 12(2)) with the side face part 12(2) (e.g., the first section) extending from the long edge 11C (e.g., the adjacent one of the sides) of the bottom face part 11 that is adjacent to the short edge 11B (e.g., the one of the sides) and the first region 12A (e.g., the second section) extending from the side face part 12(2). The second region 12B and the first region 12A of the second peripheral portion (12A, 12(2)) partially overlap with each other at a location between ends of the short edge 11B of the bottom face part 11 to form the side face part 12(1) (e.g., one of side face parts) of the reflective sheet 1 while the reflective sheet 1 is installed to the display device A. The side face part 12(2) of the second peripheral portion (12A, 12(2)) forms the side face part 12(2) (e.g., adjacent one of the side face parts) of the reflective sheet 1 that is adjacent to the side face part 12(1) of the reflective sheet 1 while the reflective sheet 1 is installed to the display device A.

With the display device A, the first region 12A is folded relative to the side face part 12(2) to form the corner 19 (e.g., the corner portion) of the reflective sheet 1 between the side face part 12(1) of the reflective sheet 1 and the side face part 12(2) of the reflective sheet 1 while the reflective sheet 1 is installed to the display device A.

With the display device A, the second region 12B and the first region 12A are disposed adjacent to each other via the first slit 15 that extends in a direction intersecting with the short edge 11B of the bottom face part 11 and has one end on the short edge 11B of the bottom face part 11.

With the display device A, the reflective sheet 1 further includes the third peripheral portion (12A, 12(2)) with the side face part 12(2) (e.g., the first section) extending from the long edge 11C (e.g., opposing one of the sides) of the bottom face part 11 that is opposite the long edge 11B (e.g., the adjacent one of the sides) of the bottom face part 11 and the first region 12A (e.g., the second section) extending from the side face part 12(2). The second region 12B (e.g., the first peripheral portion) and the first region 12A (e.g., the second section of the third peripheral portion) partially overlap with each other at a location between the ends of the short edge 11B (e.g., the one of the sides) of the bottom face part 11 to form the side face part 12(1) (e.g., the one of the side face parts) of the reflective sheet 1 while the reflective sheet 1 is installed to the display device A.

With the display device A, the second region 12B (e.g., the first peripheral portion) and the first region 12A (e.g., the second section of the third peripheral portion) are disposed adjacent to each other via the first slit 15 (e.g., the additional first slit) that extends in a direction intersecting with the short edge 11B (e.g., the one of the sides) of the bottom face part 11 and has one end on the short edge 11B (e.g., the one of the sides) of the bottom face part 11.

With the display device A, the bottom face part 11 and the first region 12A are disposed adjacent to each other via the second slit 16 that extends along the short edge 11B of the bottom face part 11. The second slit 16 extends from the one end of the first slit 15 to the long edge 11C (e.g., the adjacent one of the sides) of the bottom face part 11.

The display device A further includes the rear frame 2 (e.g., the support member) supporting the bottom face part 11 of the reflective sheet 1 from the rear side.

With the display device A, the second region 12B and the first region 12A have flaps 17 that extend from the display panel-side edges 21 (e.g., the outer edge portions) of the second region 12B and the first region 12A, respectively.

The flaps 17 of the second region 12B and the first region 12A are disposed on the outer peripheral part 2A2 of the rear frame 2 such that the flaps 17 partially overlap with each other while the reflective sheet 1 is installed to the display device A.

With the display device A, the bottom face part 11 has a rectangular shape. The short edge 11B (e.g., the one of the sides) of the bottom face part 11 is shorter than the long edge 11C (e.g., the adjacent one of the sides) of the bottom face part 11.

Second Embodiment

Referring now to FIGS. 6, 7A, 7B and 8, a display device A with a reflective sheet 1A in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Configuration of Reflective Sheet

Figure 6:
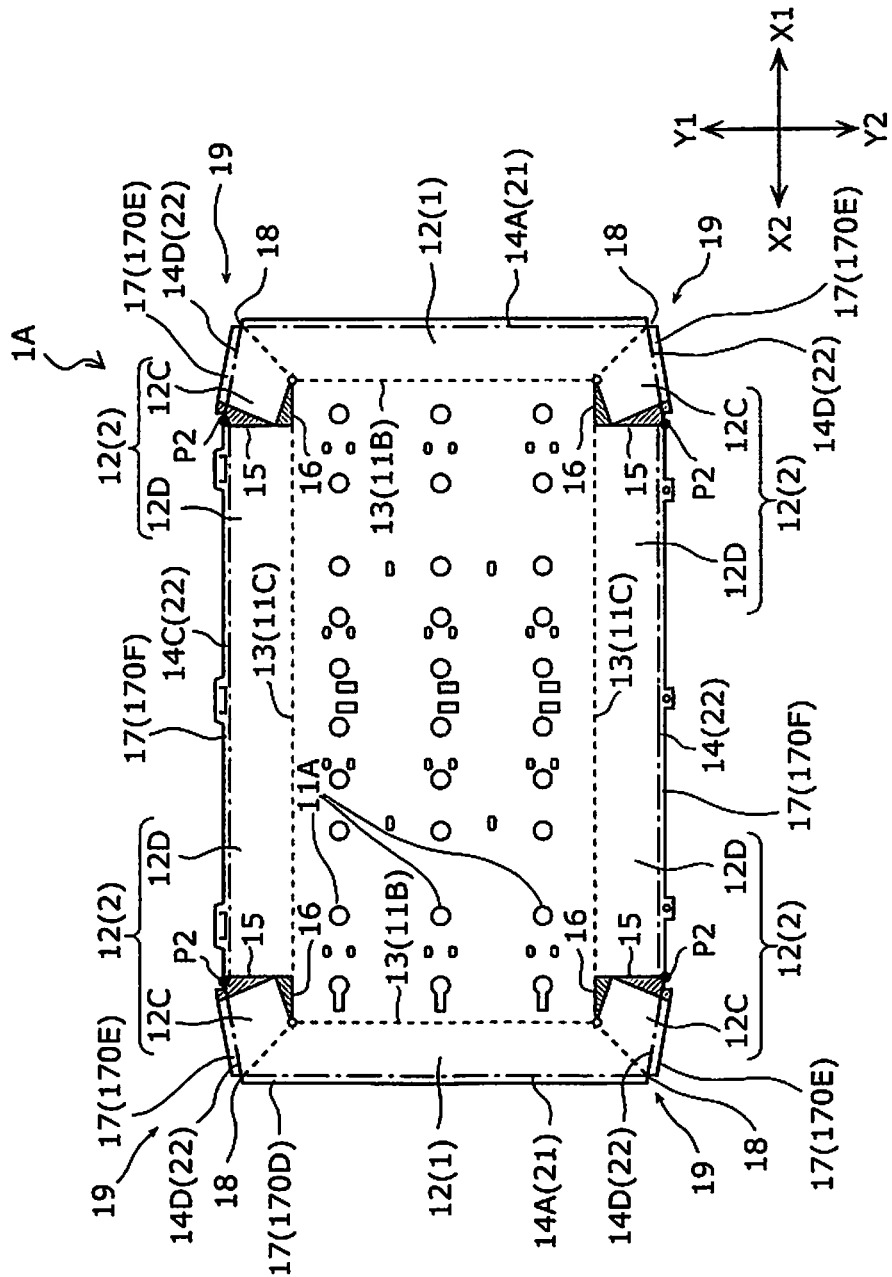
FIG. 6 is a developed view of a reflective sheet used in a display device in accordance with a second embodiment.
Figure 7A:
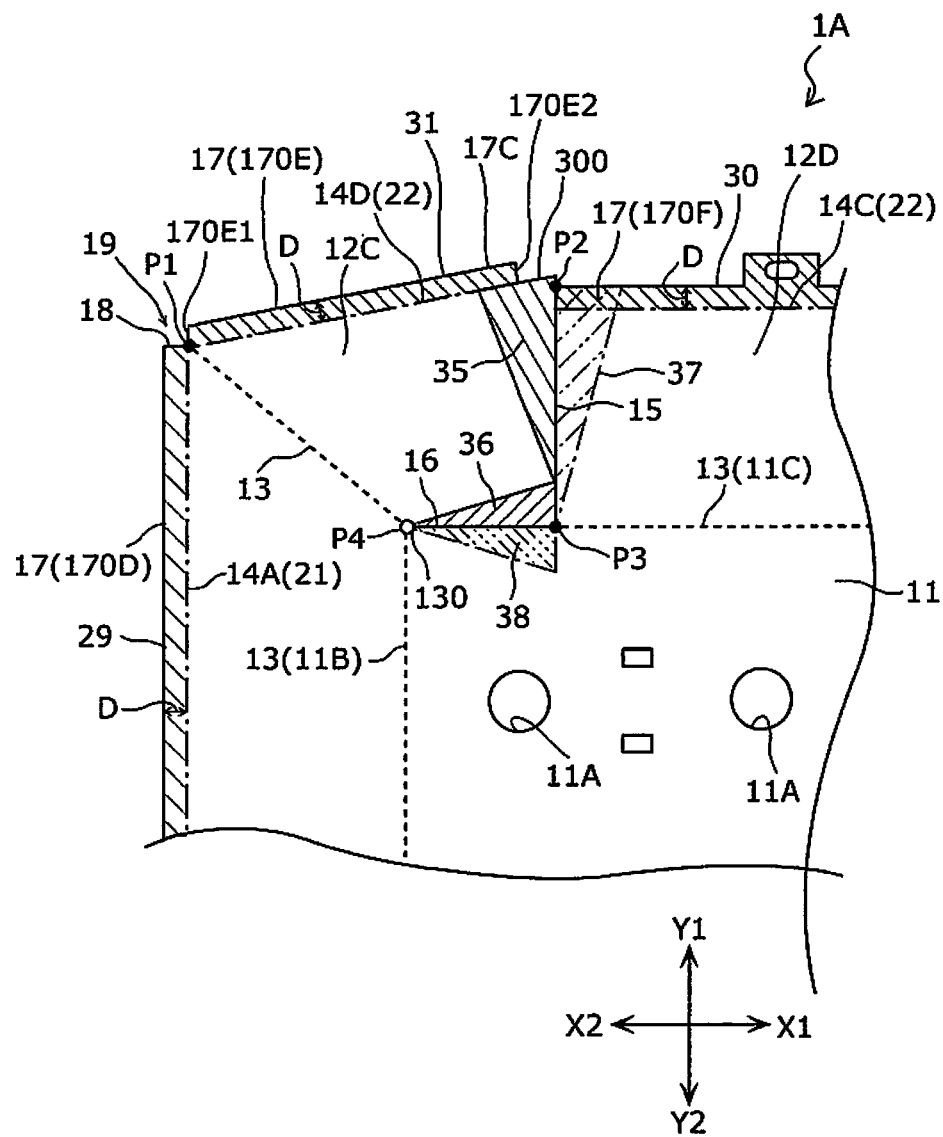
FIG. 7A is a detail view of a corner part of the reflective sheet illustrated in FIG. 6.
Figure 7B:
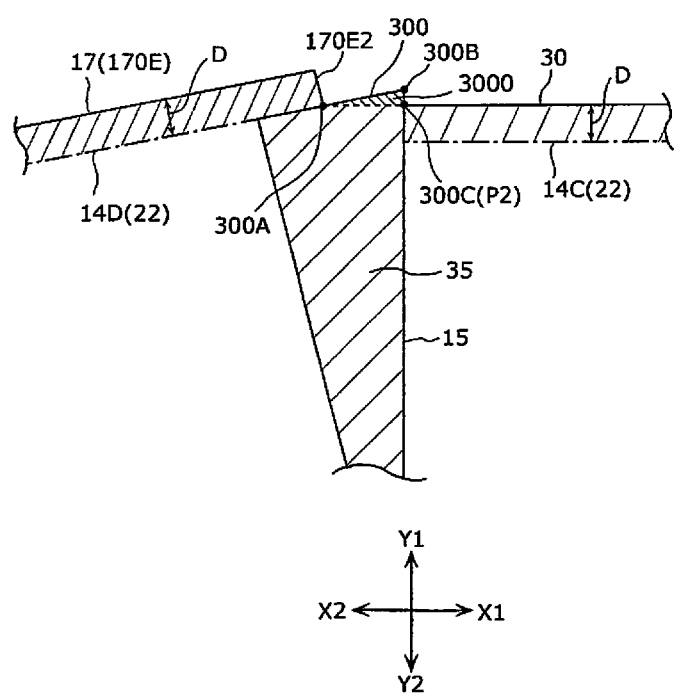
FIG. 7B is a detail view in which the corner part illustrated in FIG. 7A is further enlarged.
Figure 8:
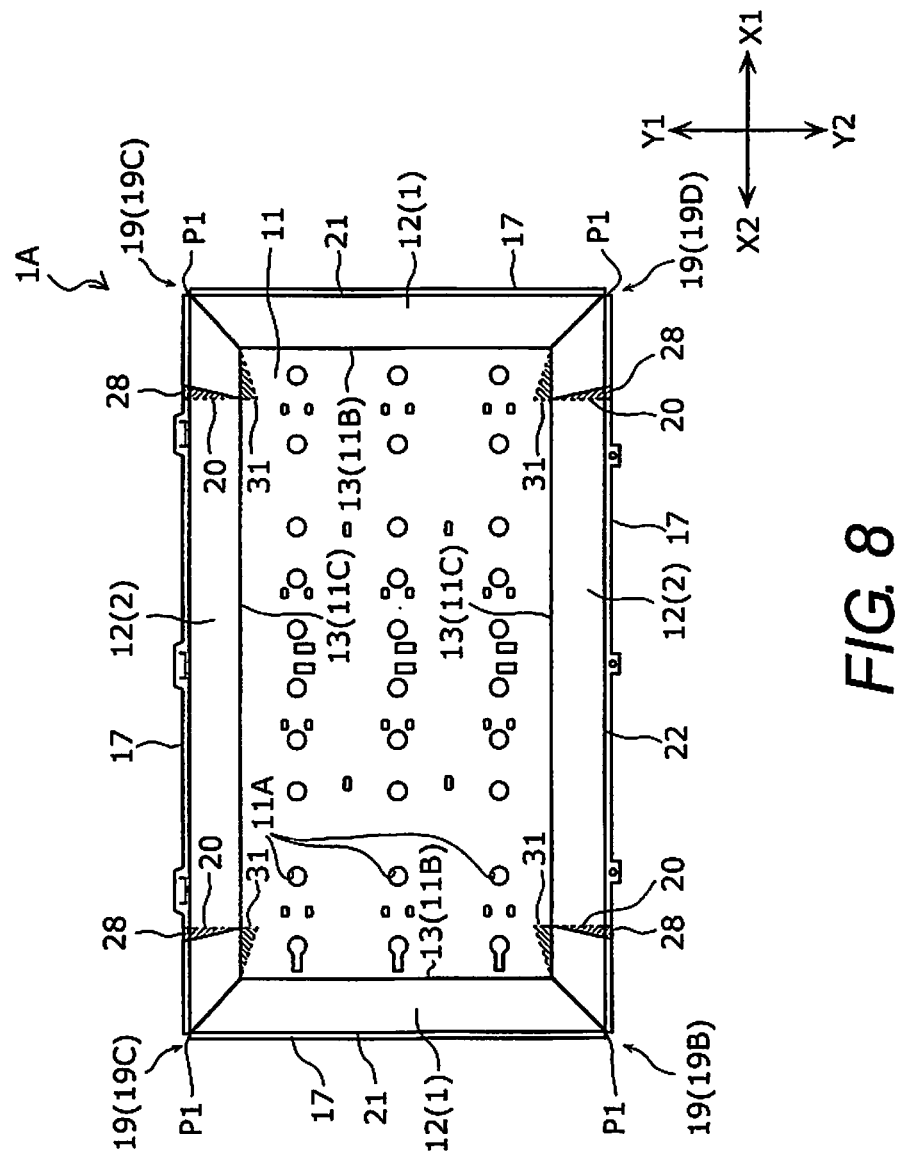
FIG. 8 is an elevational view of the reflective sheet illustrated in FIG. 6 in its assembled state.

FIG. 6 is a developed view of the reflective sheet 1A used in the display device A (see FIG. 1) in accordance with a second embodiment. FIG. 7A is a detail view of a corner part of the reflective sheet 1A illustrated in FIG. 6. FIG. 7B is a detail view in which the corner part in FIG. 7A is further enlarged. FIG. 8 is an elevational view of the reflective sheet 1A in FIG. 6 in its assembled state.

In FIGS. 6 to 8, the right direction is labeled the X1 direction, the left direction is labeled the X2 direction, the upward direction is labeled the Y1 direction, and the downward direction is labeled the Y2 direction. The corner shown in FIGS. 7A and 7B is the upper-left corner 19 in FIG. 6. The other corners 19 (the upper-right, lower-left, and lower-right corners 19) are the same as the corner 19 shown in FIGS. 7A and 7B, and therefore are not depicted or described.

As shown in FIG. 7A, at each corners 19, a second perforation 14D (indicated by a one-dot chain line in FIG. 7A) is formed extending from the apex P1 toward the outside with respect to the horizontal direction (diagonally upward to the right in FIG. 7A). These second perforations 14D form display panel-side edges 22 when the reflective sheet 1A is assembled into a concave shape.

Protruding tabs 170E, which are parallel to the second perforations 14D, are provided near the second perforations 14D. The protruding tabs 170E each have an end portion 170E1 on the apex P1 side, and an end portion 170E2 on the opposite side from the apex P1. Edges 300 are provided on extensions of the second perforations 14D from the end portions 170E2, respectively.

As shown in FIG. 7B, for example, at each corners 19, the edge 300 forms a region 3000 in the form of a right triangle, indicated by hatching going diagonally downward to the right, in the overlapping portions 35 (discussed below). This region 3000 has three apexes 300A, 300B, and 300C. The apex 300C is a point that serves as the starting point of an edge 30 that is parallel to the left and right direction. As discussed below, at each corners 19, a first slit 15 is formed using the apex 300C as its starting point P2.

As shown in FIGS. 7A and 7B, at each corners 19, a second perforation 14C is formed at a position that is a width D away from the edge 30. The width D matches how far the protruding tabs 170E protrude from the second perforations 14D. These second perforations 14C are formed parallel to the edges 30, and form the display panel-side edges 22 when the reflective sheet 1A is folded into a concave shape.

As shown in FIG. 7A, with the reflective sheet 1A, a pair of second perforations 14A (indicated by a one-dot chain line in FIG. 7A) are also formed, which extend in the vertical direction between the apexes P1. These second perforations 14A are formed parallel to edges 29, separated by the width D from the edges 29 in the left and right direction. The second perforations 14A form the display panel-side edges 21 when the reflective sheet 1A is assembled into a concave shape.

When the second perforations 14C and 14D are mountain folded, they form the display panel-side edges 22, and when the second perforations 14A are mountain folded, they form the display panel-side edges 21. When the second perforations 14A, 14C, and 14D are mountain folded, the regions between them and the end portions of the reflective sheet 1A form the flaps 17.

First perforations 13 (indicated by broken lines) are also formed in the reflective sheet 1A. As shown in FIG. 8, when the first perforations 13 are valley folded, this forms one bottom face part 11, a pair of short edge-side side face parts 12(1) that include the short edges 11B of the bottom face part 11, and a pair of long edge-side side face parts 12(2) that include the long edges 11C of the bottom face part 11.

The first perforations 13 on the short edge-side side face parts 12(1) side form the short edges 11B of the bottom face part 11 when the reflective sheet 1 is assembled into a concave shape. The first perforations 13 on the long edge-side side face parts 12(2) side form the long edges 11C of the bottom face part 11 when the reflective sheet 1 is assembled into a concave shape.

Holes 130 are formed in the four corners of the bottom face part 11 so that overlapping portions 35 of first regions 12C (discussed below) will easily go from second slits 16 (discussed below) into the rear of the bottom face part 11 (the side away from the viewer in the drawing).

As shown in FIG. 8, the display panel-side edges 21 each have two apexes P1, P1. As shown in FIG. 7A, at each corners 19, the first slit 15 is formed in the display panel-side edge 22. As shown in FIG. 7A, the starting point of the first slit 15 is a position (in this example, the starting point P2) within a predetermined proximity range of a reference apex (this reference apex is the apex P1), and the first slit 15 extends toward the long edge 11C of the bottom face part 11 and has its end point P3 at the long edge 11C.

As shown in FIG. 6, the first slits 15 divide the long edge-side side face parts 12(2) into a first region 12C that includes the reference apex P1 and a second region 12D that does not include the reference apex P1.

As shown in FIG. 7A, at each corners 19, the second slit 16 is formed extending from the end point P3 of the first slit 15, along the long edges 11C of the bottom face part 11, toward the short edge-side side face part 12(1) on the side closer to the first slit 15 out of the pair of short edge-side side face parts 12(1), with the end point P4 being the hole 130 in the bottom face part 11.

As shown in FIG. 7A, at each corners 19, the first regions 12C formed by the first slit 15 has a first overlapping portion 35 that includes the first slit 15 (a predetermined region on the first slit 15 side), and a second overlapping portion 36 that includes the second slit 16 (the end portion of the first region 12A on the second slit 16 side). In FIG. 7A, the first overlapping portion 35 is indicated by hatching going diagonally downward to the right, and the second overlapping portion 36 is indicated by hatching going diagonally downward to the left.

With the reflective sheet 1 with this configuration, in the course of assembly work, as discussed above, the first perforations 13 are valley folded, and the second perforations 14A, 14C, and 14D are mountain folded. At this point, the holes 130 make it easier for the second overlapping portions 36 of the first regions 12C to go through the second slits 16 and into the rear side of the bottom face part 11 (the side away from the viewer). Thus, the worker puts the second overlapping portions 36 into the rear side of the bottom face part 11 (the side away from the viewer).

After this, the worker brings the first regions 12C formed by the first slits 15 into contact with the surface of the second regions 12D (the side toward the viewer).

Operation

As a result, the first overlapping portions 35 (see FIG. 7A), which are predetermined ranges of the first regions 12C on the first slit 15 side of the first regions 12C, overlap predetermined ranges or regions 37 of the second regions 12D on the first slit 15 side of the second regions 12D (the region indicated by two-dot chain line hatching; see FIG. 7A). Consequently, as shown in FIG. 8, overlapping parts 20 are formed where the overlapping portions 35 overlap the regions 37.

Also, the second overlapping portions 36 (see FIG. 7A), which are predetermined ranges of the first regions 12C on the second slit 16 side of the first regions 12C, overlap predetermined regions 38 of the bottom face part 11 (the region indicated by two-dot chain line hatching; see FIG. 7A). Consequently, as shown in FIG. 8, overlapping parts 31 are formed where the overlapping portions 36 overlap the regions 38. Thus having the overlapping portions 36 overlap the regions 38 results in the overlapping portions 35 of the first regions 12C being supported by the second slits 16.

Furthermore, as shown in FIG. 7A, because the overlapping portions 35 of the first regions 12C overlap the regions 37 of the second regions 12C, the protruding tabs 170E and the end portions 170C of the second regions 12D overlap each other. This forms overlapping portions 28 in which the flaps 17 overlap each other.

Effect

With the above configuration, the overlapping portions 36 of the first regions 12C overlap with the regions 38 of the bottom face part 11. Thus, the first regions 12C are less likely to waver. Therefore, the overlapping portions 35 of the first regions 12C can overlap the regions 37 of the second regions 12D more securely. Consequently, the stiffness of the long edge-side side face parts 12(2) becomes higher.

As a result, a reflective sheet can be provided with which the concave shape of the reflective sheet can be more easily maintained, without the use of any reinforcing member even though the reflective sheet is made thinner, and the image is less likely to shake as a result of vibration or impact, without increasing the developed surface area.

Also, the second slits 16 are formed starting at the starting point P3 of the first slits 15, along the long edges 11C of the bottom face part 11, and toward the short edge-side side face parts 12(1) on the side of the first slits 15 closer to the end point P3. Thus, the second slits 16 can be shorter in length.

Therefore, unlike when the second slits 111 are formed in the entire horizontal direction of the bottom face part 11, there will be less increase in the developed surface area. Thus, the stiffness of the long edge-side side face parts 12(2) can be increased.

Furthermore, as discussed above, the overlapping portions 28 are formed where the flaps 17 overlap each other. Consequently, there is an increase in the thickness of part of the flaps 17. Thus, the shape of the flaps 17 can be stabilized.

Position of Reference Apex within Proximity Range

The position of the apex (reference apex) P1 within the proximity range is preferably a position that does not reach the center portion along the display panel-side edges 22 from the apex P1, and more precisely, is near the end portions 170E2 of the protruding tabs 170E, out of the edges 300 formed by the extension of the protruding tabs 170E (see FIGS. 7A and 7B).

In other words, the position can be such that there is no loss of the concave shape of the reflective sheet 1A even though the overlapping portions 35 and 36 overlap the regions 37 and 38 within a range from the apex P1 to a position that does not reach the center part of the long edge-side side face parts 12(2).

Other

In the illustrated embodiment, only the upper-left corner 19A is described above. However, the overlapping parts 20 and 31 and overlapping portions 28 of the flaps 17 are also formed by the method discussed above for the lower-left corner 19B, the upper-right corner 19C, and the lower-right corner 19D.

Thus, the operation and effect obtained with the lower-left corner 19B, the upper-right corner 19C, and the lower-right corner 19D are the same as those obtained with the above-mentioned upper-left corner 19A.

In particular, since two of the overlapping parts 20 are formed at the long edge-side side face parts 12(2), the stiffness will be higher at the long edge-side side face parts 12(2), which tend to sag when the thickness is reduced.

In the illustrated embodiment, the display device A includes the display panel 5, the LED 200 (e.g., the light source), and the reflective sheet 1. The LED 200 (e.g., the light source) is configured to emit light from a rear side relative to the display panel 5 toward the display panel 5. The reflective sheet 1A is disposed on the rear side relative to the display panel 5, and is configured to reflect the light from the LED 200 (e.g., the light source) toward the display panel 5. The reflective sheet 1A includes the four-sided bottom face part 11 with two pairs of mutually opposing edges 11B, 11C (e.g., sides), the second region 12D (e.g., the first peripheral portion) extending from the long edge 11C (e.g., one of the sides) of the bottom face part 11, and the second peripheral portion (12C, 12(1)) with the side face part 12(1) (e.g., the first section) extending from the short edge 11B (e.g., the adjacent one of the sides) of the bottom face part 11 that is adjacent to the long edge 11C (e.g., the one of the sides) and the first region 12C (e.g., the second section) extending from the side face part 12(1). The second region 12D and the first region 12C of the second peripheral portion (12C, 12(1)) partially overlap with each other at a location between ends of the long edge 11C of the bottom face part 11 to form the side face part 12(2) (e.g., one of side face parts) of the reflective sheet 1A while the reflective sheet 1A is installed to the display device A. The side face part 12(1) of the second peripheral portion (12C, 12(1)) forms the side face part 12(1) (e.g., adjacent one of the side face parts) of the reflective sheet 1A that is adjacent to the side face part 12(2) of the reflective sheet 1A while the reflective sheet 1A is installed to the display device A.

With the display device A, the first region 12C is folded relative to the side face part 12(1) to form the corner 19 (e.g., the corner portion) of the reflective sheet 1A between the side face part 12(2) of the reflective sheet 1A and the side face part 12(1) of the reflective sheet 1A while the reflective sheet 1A is installed to the display device A.

With the display device A, the second region 12D and first region 12C are disposed adjacent to each other via the first slit 15 that extends in a direction intersecting with the long edge 11C of the bottom face part 11 and has one end on the long edge 11C of the bottom face part 11.

With the display device A, the reflective sheet 1A further includes the third peripheral portion (12C, 12(1)) with the side face part 12(1) (e.g., the first section) extending from the short edge 11B (e.g., opposing one of the sides) of the bottom face part 11 that is opposite the short edge 11B (e.g., the adjacent one of the sides) of the bottom face part 11 and the first region 12C (e.g., the second section) extending from the side face part 12(1). The second region 12D (e.g., the first peripheral portion) and the first region 12C (e.g., the second section of the third peripheral portion) partially overlap with each other at a location between the ends of the long edge 11C (e.g., the one of the sides) of the bottom face part 11 to form the side face part 12(2) (e.g., the one of the side face parts) of the reflective sheet 1A while the reflective sheet 1A is installed to the display device A.

With the display device A, the second region 12D (e.g., the first peripheral portion) and the first region 12C (e.g., the second section of the third peripheral portion) are disposed adjacent to each other via the first slit 15 (e.g., the additional first slit) that extends in a direction intersecting with the long edge 11C (e.g., the one of the sides) of the bottom face part 11 and has one end on the long edge 11C (e.g., the one of the sides) of the bottom face part 11.

With the display device A, the bottom face part 11 and the first region 12C are disposed adjacent to each other via the second slit 16 that extends along the long edge 11C of the bottom face part 11. The second slit 16 extends from the one end of the first slit 15 to the short edge 11B (e.g., the adjacent one of the sides) of the bottom face part 11.

The display device A further includes the rear frame 2 (e.g., the support member) supporting the bottom face part 11 of the reflective sheet 1A from the rear side.

With the display device A, the second region 12D and the first region 12C have flaps 17 that extend from the display panel-side edges 22 (e.g., the outer edge portions) of the second region 12D and the first region 12C, respectively. The flaps 17 of the second region 12D and the first region 12C are disposed on the outer peripheral part 2A2 of the rear frame 2 such that the flaps 17 partially overlap with each other while the reflective sheet 1A is installed to the display device A.

With the display device A, the bottom face part 11 has a rectangular shape. The long edge 11C (e.g., the one of the sides) of the bottom face part 11 is longer than the the short edge 11B (e.g., the adjacent one of the sides) of the bottom face part 11.

Third Embodiment

Figure 9:
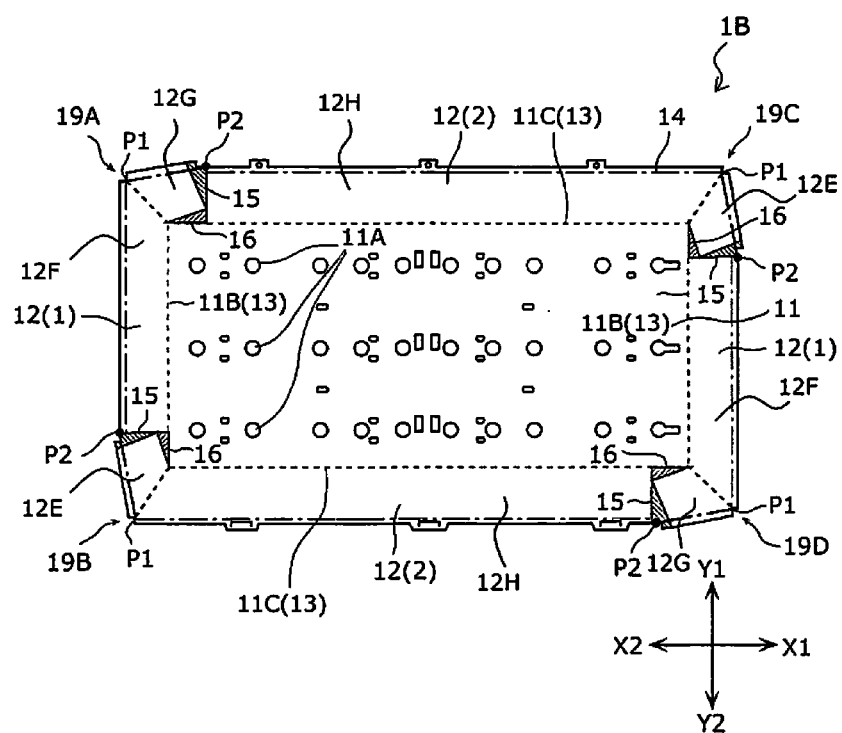
FIG. 9 is a developed view of a reflective sheet used in a display device in accordance with a third embodiment.
Figure 10:
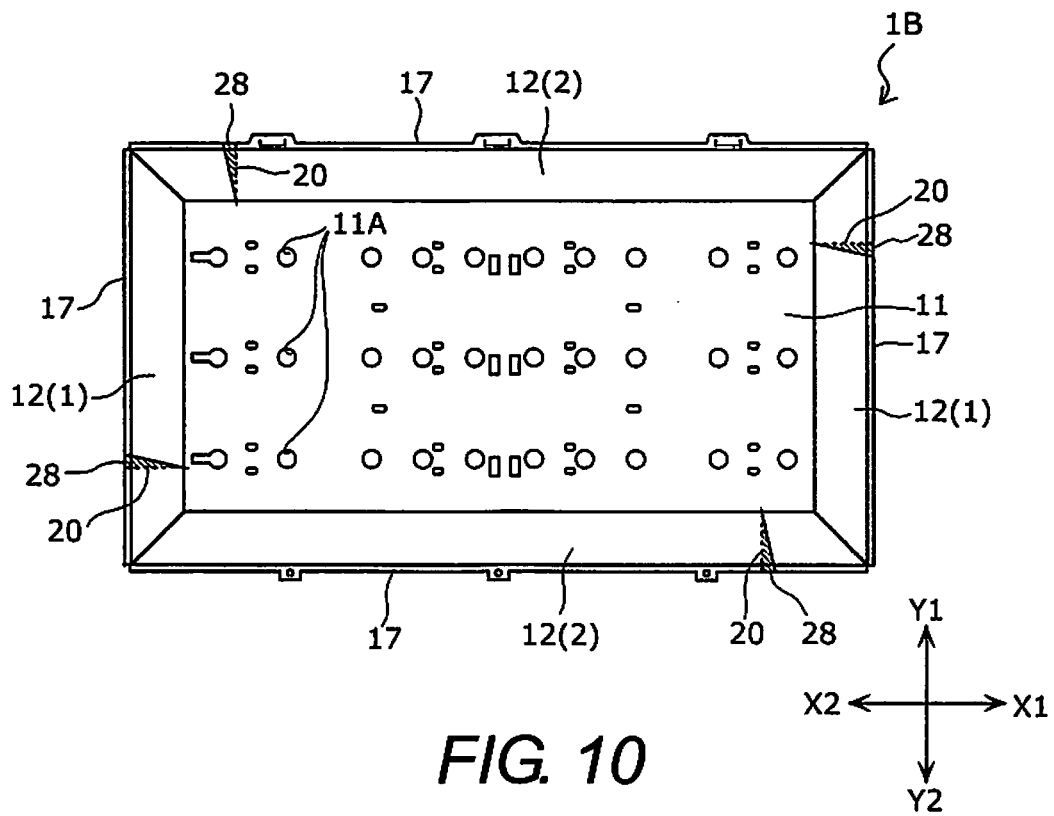
FIG. 10 is an elevational view of the reflective sheet illustrated in FIG. 9 in its assembled state.

Referring now to FIGS. 9 and 10, a display device A with a reflective sheet 1B in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Configuration of Reflective Sheet

FIG. 9 is a developed view of the reflective sheet 1B used in the display device A in accordance with a third embodiment. FIG. 10 is an elevational view of the reflective sheet 1B illustrated in FIG. 9 in its assembled state.

The third embodiment is a combination of the first and second embodiments. Therefore, those constituent elements that are the same as in the reflective sheets 1 and 1A discussed above will be numbered the same and will not be described again.

With this reflective sheet 1B, a pair of first slits 15 and a pair of second slits 16 are formed in the upper-left corner 19A and the lower-right corner 19D. The starting points of the first slits 15 are the positions P2 on the long edge-side side face parts 12(2), just as with the reflective sheet 1A discussed above. The second slits 16 are formed from the end points of the first slits 15 toward the short edge-side side face parts 12(1) on the side closer to the first slits 15, respectively.

Meanwhile, another pair of first slits 15 and another pair of second slits 16 are are formed in the lower-left corner 19B and the upper-right corner 19C. The starting points of the first slits 15 are the positions P2 on the short edge-side side face parts 12(1), just as with the reflective sheet 1 discussed above. The second slits 16 are formed from the end points of the first slits 15 toward the long edge-side side face parts 12(2) on the side closer to the first slits 15, respectively.

Effect

With this configuration, a single overlapping part 20 is formed in each of the pair of short edge-side side face parts 12(1) and the pair of long edge-side side face parts 12(2). Thus, the stiffness of all of the side face parts 12(1) and 12(2) can be increased. Also, overlapping portions 28 are formed at all of the flaps 17, namely, the flaps 17 on the side of the pair of short edge-side side face parts 12(1) and the flaps 17 on the side of the pair of long edge-side side face parts 12(2). Thus, the thickness is increased in part of each of the four flaps 17. Therefore, the overall stiffness of the four flaps 17 can be increased.

In the illustrated embodiment, the display device A includes the display panel 5, the LED 200 (e.g., the light source), and the reflective sheet 1B. The LED 200 (e.g., the light source) is configured to emit light from a rear side relative to the display panel 5 toward the display panel 5. The reflective sheet 1B is disposed on the rear side relative to the display panel 5, and is configured to reflect the light from the LED 200 (e.g., the light source) toward the display panel 5.

The reflective sheet 1B includes the four-sided bottom face part 11 with two pairs of mutually opposing edges 11B, 11C (e.g., sides), the second region 12F (e.g., the first peripheral portion) extending from the short edge 11B (e.g., one of the sides) of the bottom face part 11, and the second peripheral portion with the second region 12B (e.g., the first section) extending from the long edge 11C (e.g., the adjacent one of the sides) of the bottom face part 11 that is adjacent to the short edge 11B (e.g., the one of the sides) and the first region 12E (e.g., the second section) extending from the second region 12H. The second region 12F and the first region 12E partially overlap with each other at a location between ends of the short edge 11B of the bottom face part 11 to form the side face part 12(1) (e.g., one of side face parts) of the reflective sheet 1B while the reflective sheet 1B is installed to the display device A. The second region 12H forms the side face part 12(2) (e.g., adjacent one of the side face parts) of the reflective sheet 1B that is adjacent to the side face part 12(1) of the reflective sheet 1B while the reflective sheet 1B is installed to the display device A.

In the illustrated embodiment, with the display device A, the reflective sheet 1B further includes the fourth peripheral portion (12F, 12G) with the second region 12F (e.g., the first section) extending from the short edge 11B (e.g., the other opposing one of the sides) of the bottom face part 11 that is opposite the short edge 11B (e.g., the one of the sides) of the bottom face part 11 and the first region 12G (e.g., the second section) extending from the second region 12F. The second region 12H and the first region 12G partially overlap with each other at a location between ends of long edge 11C of the bottom face part 11 to form the side face part 12(2) (e.g., the adjacent one of the side face parts) of the reflective sheet 1B while the reflective sheet 1B is installed to the display device.

In other words, the reflective sheet 1B includes the second region 12H (e.g., the first peripheral portion) extending from the long edge 11C (e.g., one of the sides) of the bottom face part 11, and the second peripheral portion with the second region 12F (e.g., the first section) extending from the short edge 11B (e.g., the adjacent one of the sides) of the bottom face part 11 that is adjacent to the long edge 11C (e.g., the one of the sides) and the first region 12G (e.g., the second section) extending from the second region 12F. The second region 12H and the first region 12G partially overlap with each other at a location between ends of the long edge 11C of the bottom face part 11 to form the side face part 12(2) (e.g., one of side face parts) of the reflective sheet 1B while the reflective sheet 1B is installed to the display device A. The second region 12H forms the side face part 12(1) (e.g., adjacent one of the side face parts) of the reflective sheet 1B that is adjacent to the side face part 12(2) of the reflective sheet 1B while the reflective sheet 1B is installed to the display device A.

Also, with the display device A, the reflective sheet 1B further includes the fourth peripheral portion (12H, 12E) with the second region 12H (e.g., the first section) extending from the long edge 11C (e.g., the other opposing one of the sides) of the bottom face part 11 that is opposite the long edge 11C (e.g., the one of the sides) of the bottom face part 11 and the first region 12E (e.g., the second section) extending from the the second region 12H. The second region 12F and the first region 12E partially overlap with each other at a location between ends of short edge 11B of the bottom face part 11 to form the side face part 12(1) (e.g., the adjacent one of the side face parts) of the reflective sheet 1B while the reflective sheet 1B is installed to the display device.

The present invention can be applied to a device that reflects a light flux produced by LEDs and directs it toward a display panel, such as a liquid crystal display device.

Comparative Examples

Advantages of the reflective sheets 1 and 1A in accordance with the first to third embodiments will be explained in view of comparative examples.

Figure 11:
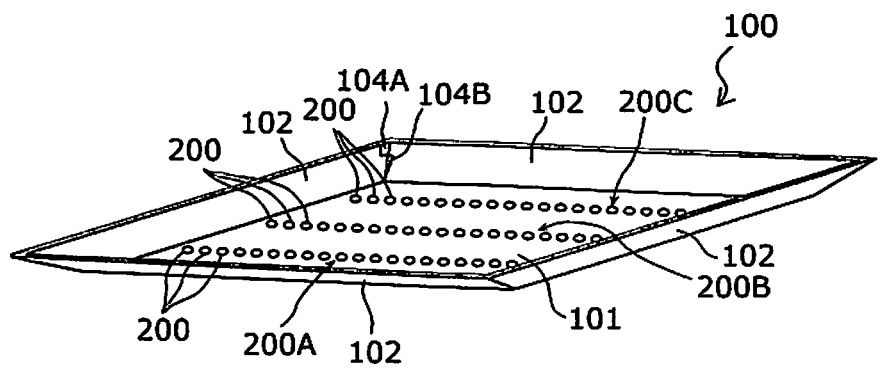
FIG. 11 is a perspective view of a reflective sheet in accordance with a comparative example.
Figure 12:
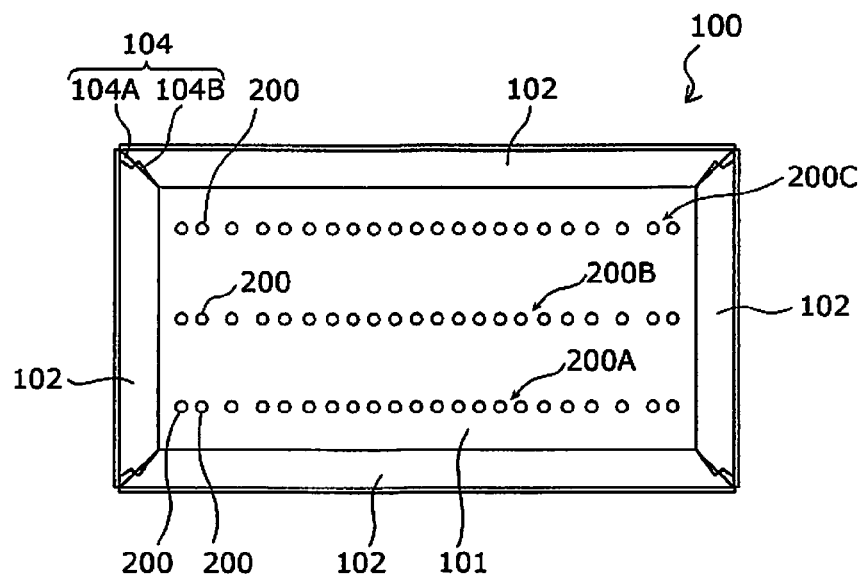
FIG. 12 is an elevational view of the reflective sheet illustrated in FIG. 11.

FIG. 11 is a perspective view of a reflective sheet 100 in accordance with a comparative example. FIG. 12 is an elevational view of the reflective sheet 100 illustrated in FIG. 11. In FIGS. 11 and 12, the X axis is the horizontal direction, and the Y axis is the vertical direction.

This type of reflective sheet 100 includes a rectangular bottom face part 101 and four side face parts 102 that are disposed so as to surround the four sides of the bottom face part 101.

LED groups 200A to 200C, in which a plurality of LEDs 200 are arranged in the horizontal direction, are disposed in a specific number of rows (three rows in this example) in the vertical direction on the bottom face part 101.

In FIGS. 11 and 12, overlaps 104A and 104B are formed at the boundary portions of the two side face parts 102, respectively, so that the slits 104 will not open up and lower the reflection efficiency of the reflective sheet 100. The overlaps 104A and 104B overlap the end portions of the adjacent side face parts 102, respectively.

Figure 13:
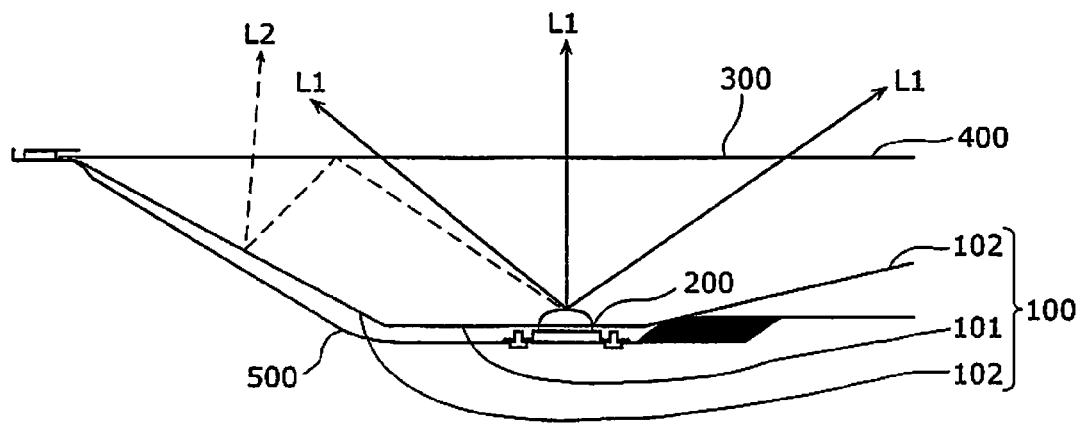
FIG. 13 is a side view of the reflective sheet illustrated in FIG. 11, illustrating the function of the reflective sheet.

FIG. 13 is a side view of the reflective sheet 100 illustrated in FIG. 11, illustrating the function of the reflective sheet 100.

The reflective sheet 100 is attached above a rear frame 500. The side face parts 102 of the reflective sheet 100 are disposed along the surface of the rear frame 500.

Holes through which LEDs 200 are passed are formed in the bottom face part 101 of the reflective sheet 100, and the LEDs 200 are passed through these holes. A diffuser 400 is provided in the optical axis direction of the LEDs 200. The diffuser 400 diffuses light from the LEDs 200.

The reflective sheet 100 reflects light other than the light that reaches the diffuser 400 directly (such as the light axis L1). In other words, the reflective sheet 100 reflects light that does not reach the diffuser 400 directly and is not directly transmitted by the diffuser 400 (such as the light axis L2), and allows this light to be transmitted by the diffuser 400. That is, the reflective sheet 100 "recycles" the light by reflecting light not transmitted directly from the LEDs 200 to the diffuser 400, and allowing this light to reach the diffuser 400.

Figure 14:
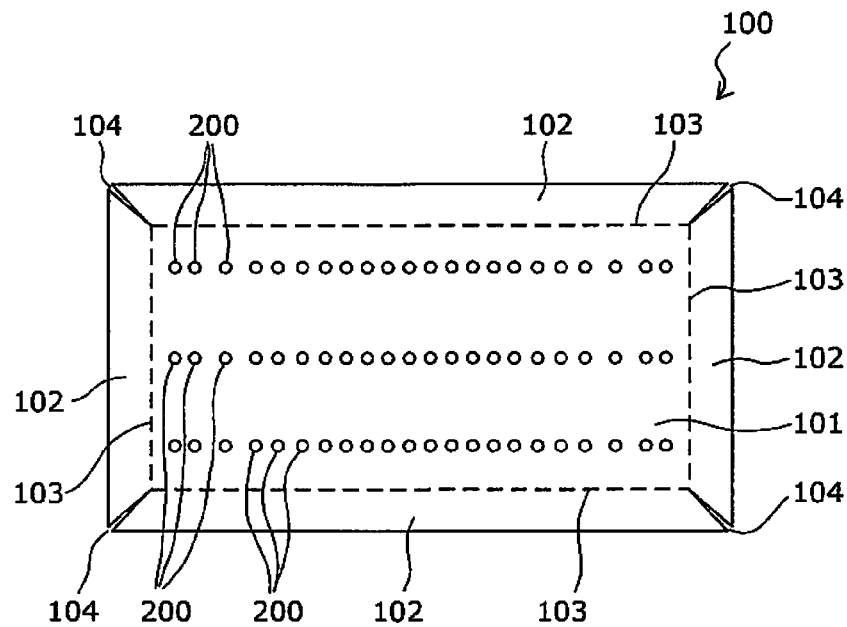
FIG. 14 is a developed view of a reflective sheet in accordance with a comparative example.

FIG. 14 is a developed view of a reflective sheet 100 in accordance with another comparative example. This reflective sheet 100 is produced by the valley folding along perforations 103 that do not transmit light (the perforations 103 are indicated by broken lines). This forms a rectangular bottom face part 101 and four side face parts 102, which each include one of the four sides of the bottom face part 101.

Slits 104 are formed in the four corners of the reflective sheet 100 so that the valley folding along the perforations 103 will produce a concave shape.

When the slits 104 are thus provided to the four corners, there tend to be gaps where the slits 104 come together. Thus, with the display panel provided above the reflective sheet 100, the light flux may not always reach the positions directly over the slits 104. If this happens, the image displayed on the display panel will tend to be uneven.

On the other hand, with the reflective sheet 100 illustrated in FIGS. 11 and 12, the overlaps 104A and 104B are formed to help prevent this. When the overlaps 104A and 104B contact with the adjacent side face parts 102, respectively, it is less likely that gaps will be formed in the four corners. However, overlapping the overlaps 104A and 104B with the adjacent side face parts 102 is not a simple job. This in turn increases the number of assembly steps.

There is also a method in which the mating parts of the slits 104 (see FIG. 14) are reinforced with hooks, but the hooks can come loose if they stick out from the diffuser 400. Also, hooking the hooks together takes more time.

It has been discovered that there is a need to reduce the thickness of the reflective sheet 100 in order to bring down costs. However, if the reflective sheet 100 is made thinner, then the stiffness of the side face parts 102 is reduced, and the side face parts 102 tend to sag.

Figure 15:
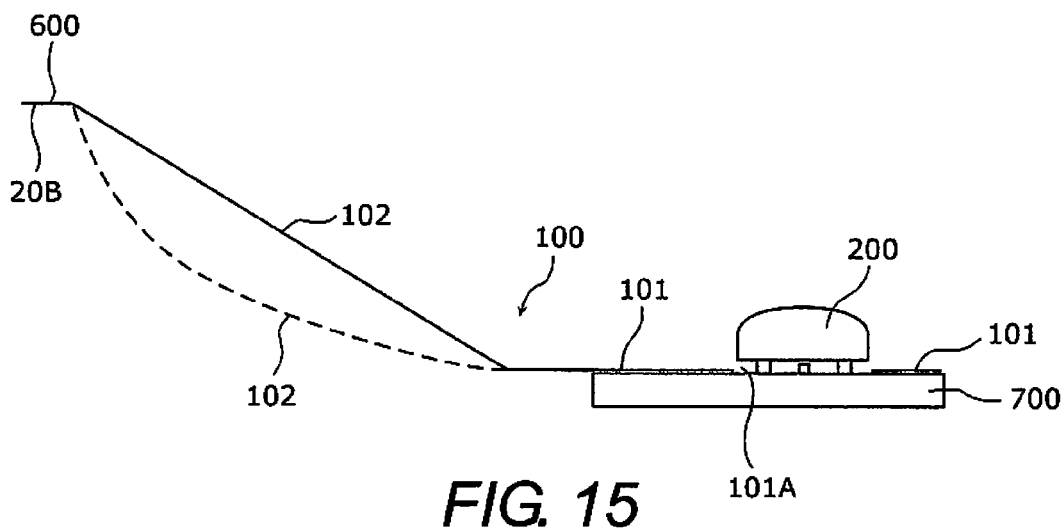
FIG. 15 is a diagram illustrating a state when a side face part of a reflective sheet in accordance with a comparative example are sagged.

FIG. 15 is a diagram illustrating a state when the side face parts 102 sag. The reflective sheet 100 can be fixed to a rear frame 2 (see FIG. 2) by overlapping flaps 600 (provided to the side face parts 102) with outer peripheral parts 2A2 of the rear frame 2 (see FIG. 2).

Meanwhile, a plurality of holes 101A through which the LEDs 200 are passed are formed in the bottom face part 101, and the bottom face part 101 is placed on an LED substrate 700 on which the LEDs 200 are mounted. In this reflective sheet 100, the outer peripheral parts 2A2 of the rear frame 2 contribute to the fixing of the reflective sheet 100, but the LED substrate 700 does not contribute to the fixing of the reflective sheet 100.

Thus, the side face part 102 can be considered as a single board that is fixed at just one end to a wall. This affords a "cantilever formula" in which the side face parts 102 are considered as a single board.

Figure 16:
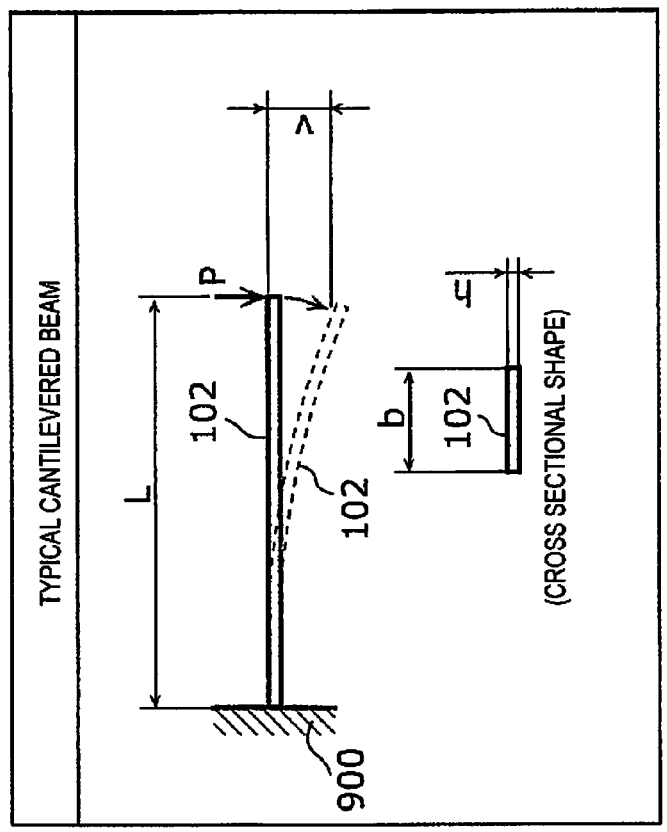
FIG. 16 illustrates a cantilevered beam formula under the condition in which the side face part is considered to be a single board.

FIG. 16 is a diagram illustrating the "cantilevered beam formula" under the condition in which the side face parts 102 are considered as a single board. In FIG. 16, it is assumed that one end of the side face part 102 considered to be a board or beam is fixed to a wall 900, and the other end of the side face part 102 is not fixed.

In this case, E represents the vertical elastic coefficient of the side face part 102, h represents the thickness of the side face part 102, L represents the length of the side face part 102, b represents the width of the side face part 102, and P represents the load exerted on the other end of the side face part 102. In this case, the moment of inertia of area of the side face part 102 is expressed as $I_z = bh^3/12$.

The amount of sag v of the side face part 102 is $v = PL^3/3EL_z$. Thus, the lower is the thickness h of the side face parts 102, the lower is the moment of inertia of area and the greater is the amount of sag v of the side face parts 102.

As discussed above, when the reflective sheet 100 is made thinner, the side face parts 102 tend to sag. This makes it difficult to maintain the concave shape of the reflective sheet 100 in accordance with the comparative example. In this case, a gap is more likely to occur between two adjacent side face parts 102, resulting in image unevenness. Also, the side face parts 102 are apt to undulate as a result of vibration or impact. This makes the image look as if it is shaking.

Figure 17:
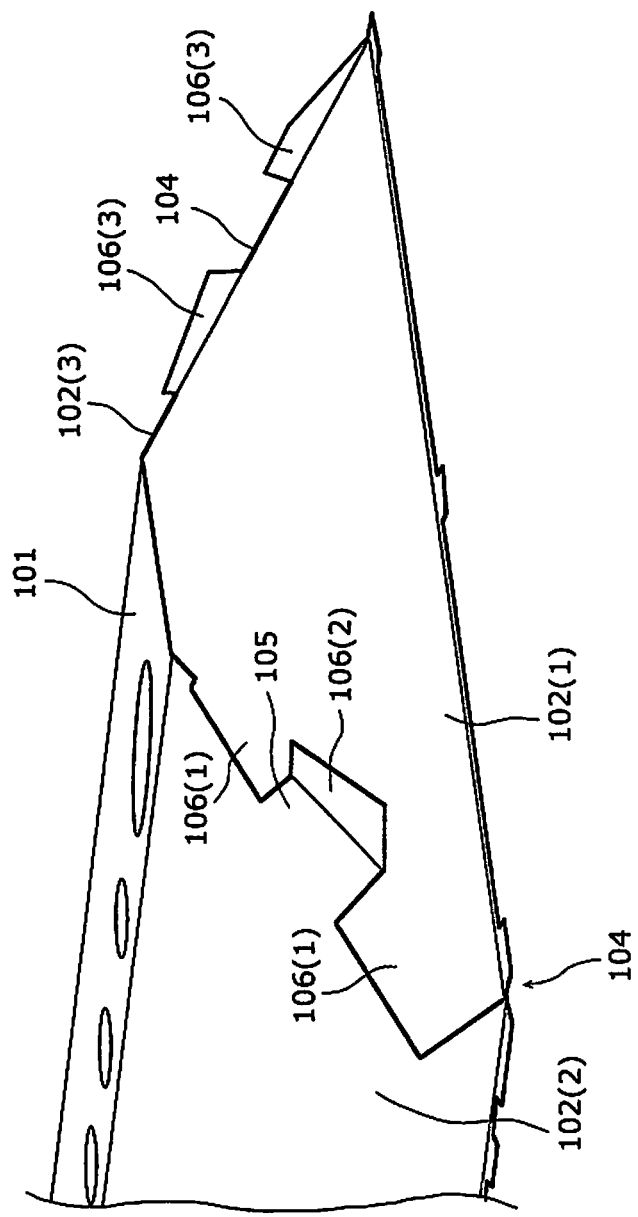
FIG. 17 is a perspective view of a reflective sheet in accordance with a comparative example in which folded parts are provided to adjacent side face parts, respectively.

In view of this, with a reflective sheet in accordance with another comparative example illustrated in FIG. 17, in order to maintain the concave shape of the reflective sheet even if this sagging occurs, folded parts 106 are provided to adjacent side face parts 102 such that the folded part formed on one side face part 102 is folded toward the adjacent side face part 102.

FIG. 17 illustrates the reflective sheet in which the folded parts 106 are provided to the adjacent side face parts 102, respectively.

At the boundary between the adjacent side face parts 102(1) and 102(2), a concave part 105 is formed in one side face part 102(1) that mates with the folded part 106(2) formed on the other side face part 102(2).

Also, the folded parts 106(1) are formed on the side face part 102(1), and are folded toward the other side face part 102(2).

Meanwhile, the folded part 106(2) is formed on the other side face part 102(2), and is folded toward the side face part 102(1) and mates with the concave part 105 formed in the side face part 102(1).

The folded parts 106(3) and a concave part (not shown) are also formed at the boundary between the side face part 102(1) and the side face part 102(3) that is adjacent on the opposite side from the side face part 102(2), just as at the boundary between the side face part 102(1) and the side face part 102(2).

However, folding these folded parts 106(1) to 106(3) entails extra work, and leads to more assembly steps.

Figure 18A:
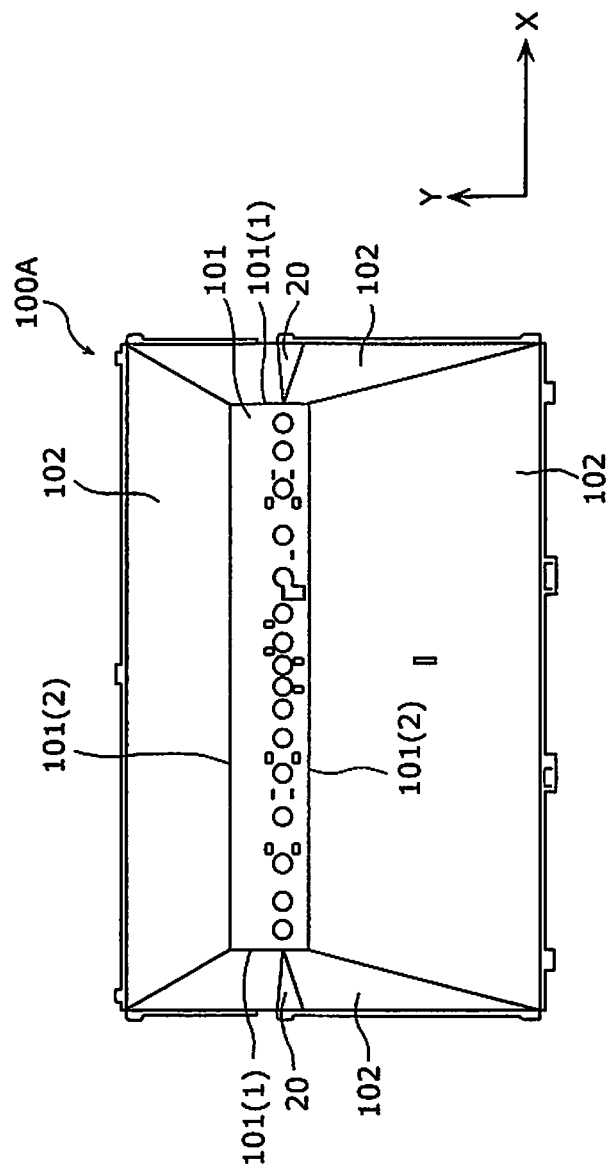
FIG. 18A is an elevational view of a reflective sheet in accordance with a comparative example in its assembled state.

On the other hand, it has been discovered that with a reflective sheet 100A illustrated in FIG. 18A in accordance with yet another comparative example, image unevenness, or image shake caused by vibration or impact, can be less likely to occur, and a concave shape can be easily maintained without using any reinforcing members even when the thickness of the reflective sheet is reduced.

Figure 18B:
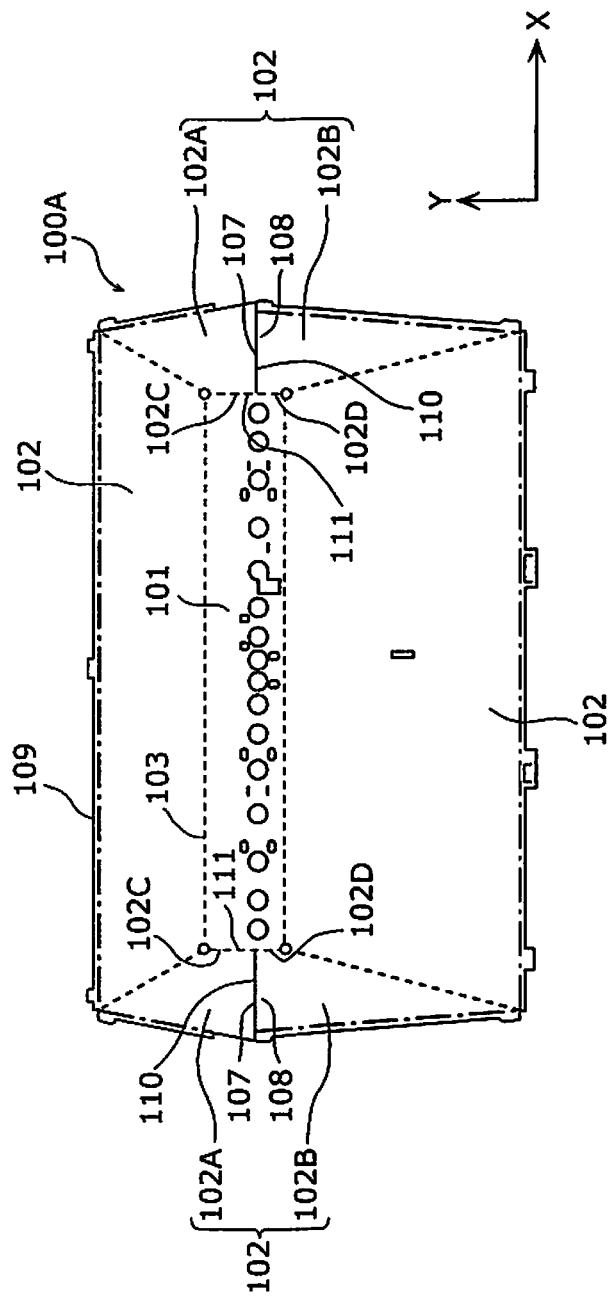
FIG. 18B is a developed view of the reflective sheet illustrated in FIG. 18A.

FIG. 18A is an elevational view of the reflective sheet 100A in its assembled state, and FIG. 18B is a developed view of the reflective sheet 100A illustrated in FIG. 18A. In FIGS. 18A and 18B, the X axis is the horizontal direction, and the Y axis is the vertical direction.

This reflective sheet 100A is assembled in a concave shape by valley folding along perforations 103 shown in FIG. 18B (indicated by broken lines). Consequently, the reflective sheet 100A has a rectangular bottom face part 101 and four side face parts 102 that surround the bottom face part 101. The bottom face part 101 has a pair of short sides 101(1) and a pair of long sides 101(2). As discussed below, second slits 111 are formed in the entire short sides 101(1).

Flaps 600 (see FIG. 15) are formed by mountain folding along the perforations 109 shown in FIG. 18B (indicated by one-dot chain lines).

On the reflective sheet 100A, first slits 110 that divide each of the side face parts 102 into two regions 102A and 102B are formed in the center portions of the pair of side face parts 102 on the side of the bottom face part 101 with the short sides 101(1) so as to reach the short sides 101(1) of the bottom face part 101 in the horizontal direction.

The second slits 111 are formed along the entire of the short sides 101(1) of the bottom face part 101 so that the end portions 102C of the regions 102A on the side closer to the bottom face part 101 out of the regions 102A formed by the first slits 110, and the end portions 102D of the regions 102B on the side closer to the bottom face part 101 out of the regions 102B formed by the first slits 110 contact with the rear face (the side farthest from the viewer in the drawings) of the bottom face part 101.

With this configuration, when the perforations 103 indicated by the broken lines are valley folded, the end portions 107 of the regions 102A on the first slit 110 side and the end portions 108 of the regions 102B on the first slit 110 side will overlap. At this point, the worker puts the end portions 102C on the side of the regions 102A closer to the bottom face part 101, and the end portions 102D on the side of the regions 102B closer to the bottom face part 101 into the second slits 111.

As shown in FIG. 18A, this forms overlapping parts 20 between the regions 102A and the regions 102B. These overlapping parts 20 are fixed when the end portions 102C of the regions 102A and the end portions 102D of the regions 102B overlap on the rear side of the bottom face part 101.

With this reflective sheet 100A, the first slits 110 that reach all the way to the bottom face part 101 are formed in the center portions of the pair of side face parts 102, and the second slits 111 are formed in the entire short sides 101(1) of the bottom face part 101 perpendicular to the first slits 110. However, the effect of the reflective sheet 100A discussed above is limited while the dimension (the length of the short sides 101(1)) of the bottom face part 101 is short.

Therefore, the following problems are still encountered when the bottom face part 101 is large in the vertical direction.

Figure 19A:
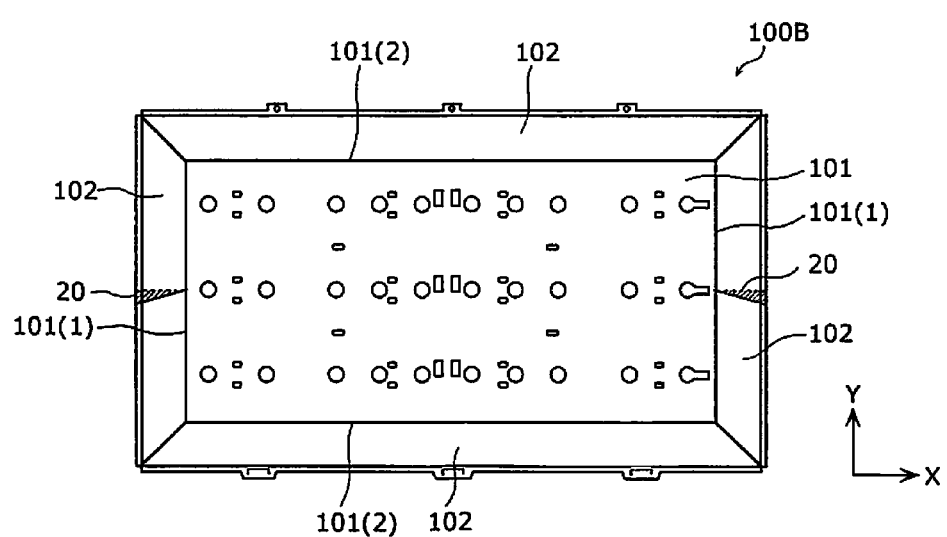
FIG. 19A is an elevational view of a reflective sheet in accordance with a comparative example in its assembled state, the reflective sheet having a greater height of a bottom face part.
Figure 19B:
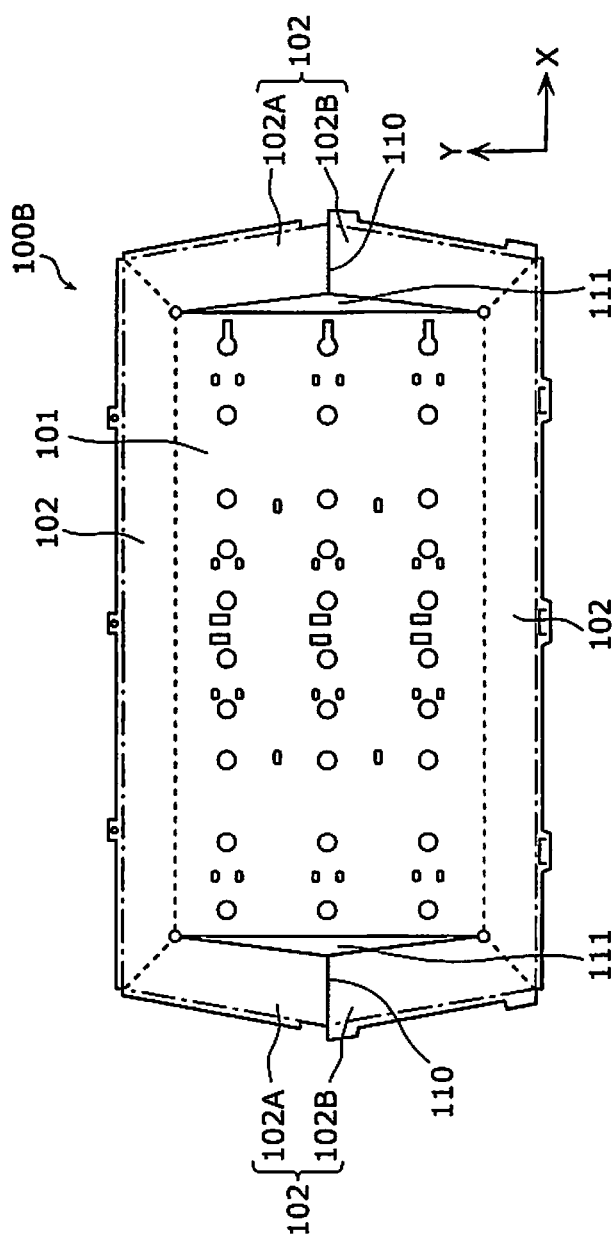
FIG. 19B is a developed view of the reflective sheet illustrated in FIG. 19A.

FIG. 19A shows the assembled state of a reflective sheet 100B in accordance with further another comparative example that has a greater height of the bottom face part 101, and FIG. 19B is a developed view of the reflective sheet 100B illustrated in FIG. 19A. In FIGS. 19A and 19B, the X axis is the horizontal direction, and the Y axis is the vertical direction.

With this reflective sheet 100B, as shown in FIGS. 19A and 19B, the bottom face part 101 has a pair of short sides 101(1) that are longer than the short sides 101(1) of the reflective sheet 100A discussed above. The bottom face part 101 also has a pair of long sides 101(2).

With this reflective sheet 100B, the second slits 111 are formed in the entire short sides 101(1) of the bottom face part 101. Since the short sides 101(1) of the bottom face part 101 are themselves longer than those of the reflective sheet 100A discussed above, the second slits 111 are longer. Also, the second slits 111 have to be formed in an approximately triangular shape in order to stabilize the concave shape when the reflective sheet 100B is assembled.

When the second slits 111 are thus made longer, the fixing of the regions 102A and 102B by the second slits 111 tends to be weak, and overlapping between the regions 102A and the regions 102B tends to be lost. As a result, the stiffness of the side face parts 102 of the reflective sheet 100B becomes lower.

Also, when the second slits 111 are made longer as shown in FIGS. 19A and 19B, the second slits 111 have to be formed in an approximately triangular shape in order to stabilize the concave shape of the reflective sheet 100B. In this case, the developed surface area of the reflective sheet 100B becomes larger. And when the developed surface area is larger, the stiffness of the reflective sheet 100B also decreases.

On the other hand, with the reflective sheets 1 and 1A in accordance with the first to third embodiments, unevenness of the brightness on the display panel 5, or image shake caused by vibration or impact, will be less likely to occur, the concave shape of the reflective sheets 1 and 1A can be maintained without using any reinforcing members even when the thickness is reduced, and the developed surface area can also be reduced.

The display device in accordance with one aspect of the present invention includes a display panel, a light source that is configured to emit light from the rear face side of the display panel toward the display panel, and a reflective sheet that is disposed on the rear face side of the display panel and reflects the light from the light source toward the display panel. The reflective sheet is folded so as to include a four-sided bottom face part having two pairs of mutually opposing sides, and four side face parts disposed so as to surround the four sides of the bottom face part, without any slits being formed at the boundaries of the four side face parts. The four side face parts each have a display panel-side edge that is the edge on the display panel side, at least one first slit, whose starting point is a position within a predetermined proximity range relative to a reference apex that is one or both of two apexes on the display panel-side edge, out of the display panel-side edges, and that extends toward the bottom face part and has an end point on the edge of the bottom face part, is formed in each of at least one pair of mutually opposing side face parts. The first slits divide the pair of side face parts into two regions each. Each of the two regions has a predetermined range on the first slit side, and the predetermined ranges of the two regions overlap each other.

With this configuration, at least one first slit, whose starting point is a position within the predetermined proximity range from the reference apex, out of the display panel-side edge that is the edge on the display panel side, and whose end point is the edge of the bottom face part, is formed in each of at least one pair of side face parts out of the four side face parts. Each one of the pair of side face parts is divided by the first slit into two regions, and predetermined ranges of the two regions on the first slit side overlap each other.

Therefore, overlapping portions, in which the two regions are overlapping, are formed in each of at least one pair of side face parts. Thus, the overlap increases part of the thickness in at least one pair of side face parts. This increases the stiffness of at least one pair of side face parts.

As a result, even if the reflective sheet is made thinner, it will be easier to maintain the concave shape of the reflective sheet without using any reinforcing members, and less likely that image unevenness will occur, or shaking of the image caused by vibration or impact.

Also, two of the first slits, whose reference apexes are two apexes on the display panel-side edge, can be formed in each of the pair of side face parts.

With this configuration, since two first slits are formed in each of the pair of side face parts, there are overlapped portions at two places on a single side face part. As a result, compared to when there is only one overlapped portion, there are more places where the thickness is greater. Thus, the stiffness of the side face parts can be increased.

Also, the configuration can be such that a second slit is formed whose starting point is the end point of the first slit, and which extends along the edge of the bottom face part in the direction of the side face part closest to the end point of the first slit. The two regions are a first region in which the second slit is formed and a second region in which the second slit is not formed. The second slit supports the end of the reflective sheet on the second slit side.

With this configuration, since the second slit supports the end of the first region on the second slit side, the first and second regions can be kept in a stable overlapping state.

Also, the configuration can further includes a rear face side support member that supports the bottom face part of the reflective sheet from the rear face side of the reflective sheet. Flaps that overlap the outer peripheral part of the rear face side support member are provided to the display panel-side edge. When the two regions are overlapped, the flaps of the two regions overlap each other.

With this configuration, since the flaps of the regions overlap each other when the two regions are overlapped, the thickness is greater at a portion of the flap, which increases the stiffness of the flaps.

Also, the configuration can be such that the bottom face part is rectangular, having two long sides that are parallel to each other, and two short sides that are parallel to each other, and the side face parts in which the first slits are formed are short-edge side face parts that include the short sides.

With this configuration, since overlapping portions produced by the first slits are formed in the short-edge side face parts, the stiffness of the short-edge side face parts can be increased.

Alternatively, the configuration can be such that the bottom face part is rectangular, having two long sides that are parallel to each other, and two short sides that are parallel to each other, and the side face parts in which the first slits are formed are the pair of long-edge side face parts that include the long sides.

With this configuration, since overlapping portions produced by the first slits are formed in the long-edge side face parts, the stiffness of the long-edge side face parts can be increased.

Also, the configuration can be such that the first slits are formed in the four side face parts, and one first slit is formed in the side face parts.

With this configuration, since one overlapped portion produced by the first slit is formed in each of the four side face parts, the stiffness can be increased in all of the side face parts.

With the present invention, image unevenness, or image shake caused by vibration or impact, will be less likely to occur, and a concave shape can be easily maintained without using any reinforcing members even when the thickness is reduced, all of which is accomplished without increasing the developed surface area.

In accordance with a first aspect, a display device comprises: a display panel; a light source configured to emit light from a rear side relative to the display panel toward the display panel; and a reflective sheet disposed on the rear side relative to the display panel, and configured to reflect the light from the light source toward the display panel. The reflective sheet includes a four-sided bottom face part with two pairs of mutually opposing sides, a first peripheral portion extending from one of the sides of the bottom face part, and a second peripheral portion with a first section extending from adjacent one of the sides of the bottom face part that is adjacent to the one of the sides and a second section extending from the first section. The first peripheral portion and the second section of the second peripheral portion partially overlap with each other at a location between ends of the one of the sides of the bottom face part to form one of side face parts of the reflective sheet while the reflective sheet is installed to the display device. The first section of the second peripheral portion form adjacent one of the side face parts of the reflective sheet that is adjacent to the one of the side face parts of the reflective sheet while the reflective sheet is installed to the display device.

In accordance with a second aspect, with the display device according to the first aspect, the second section is folded relative to the first section to form a corner portion of the reflective sheet between the one of the side face parts of the reflective sheet and the adjacent one of the side face parts of the reflective sheet while the reflective sheet is installed to the display device.

In accordance with a third aspect, with the display device according to the first aspect, the first peripheral portion and the second section of the second peripheral portion are disposed adjacent to each other via a first slit that extends in a direction intersecting with the one of the sides of the bottom face part and has one end on the one of the sides of the bottom face part.

In accordance with a fourth aspect, with the display device according to the third aspect, the reflective sheet further includes a third peripheral portion with a first section extending from opposing one of the sides of the bottom face part that is opposite the adjacent one of the sides of the bottom face part and a second section extending from the first section, the first peripheral portion and the second section of the third peripheral portion partially overlapping with each other at a location between the ends of the one of the sides of the bottom face part to form the one of the side face parts of the reflective sheet while the reflective sheet is installed to the display device.

In accordance with a fifth aspect, with the display device according to the fourth aspect, the first peripheral portion and the second section of the third peripheral portion are disposed adjacent to each other via an additional first slit that extends in a direction intersecting with the one of the sides of the bottom face part and has one end on the one of the sides of the bottom face part.

In accordance with a sixth aspect, with the display device according to the first aspect, the bottom face part and the second section of the second peripheral portion are disposed adjacent to each other via a second slit that extends along the one of the sides of the bottom face part, with the second slit extending from the one end of the first slit to the adjacent one of the sides of the bottom face part.

In accordance with a seventh aspect, with the display device according to the first aspect further comprises a support member supporting the bottom face part of the reflective sheet from the rear side.

In accordance with an eighth aspect, with the display device according to the seventh aspect, the first peripheral portion and the second section of the second peripheral portion have flaps that extend from outer edge portions of the first peripheral portion and the second section of the second peripheral portion, respectively, the flaps of the first peripheral portion and the second section of the second peripheral portion being disposed on an outer peripheral part of the support member such that the flaps partially overlap with each other while the reflective sheet is installed to the display device.

In accordance with a ninth aspect, with the display device according to the first aspect, the bottom face part has a rectangular shape, with the one of the sides of the bottom face part being shorter than the adjacent one of the sides of the bottom face part.

In accordance with a tenth aspect, with the display device according to the first aspect, the bottom face part has a rectangular shape, with the one of the sides of the bottom face part being longer than the adjacent one of the sides of the bottom face part.

In accordance with an eleventh aspect, with the display device according to the first aspect, the reflective sheet further includes a fourth peripheral portion with a first section extending from the other opposing one of the sides of the bottom face part that is opposite the one of the sides of the bottom face part and a second section extending from the first section, the first section of the second peripheral portion and the second section of the fourth peripheral portion partially overlapping with each other at a location between ends of the adjacent one of the sides of the bottom face part to form the adjacent one of the side face parts of the reflective sheet while the reflective sheet is installed to the display device.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the front of the display device, and the "left" when referencing from the left side as viewed from the front of the display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a display portion;
a light source; and
a reflector that reflects light from the light source,
the reflector having a rectangular bottom part, first and second peripheral parts that partially extend from first opposing sides of the bottom part, and third and fourth peripheral parts that extend from second opposing sides of the bottom part that are adjacent to the first opposing sides, the first and second peripheral parts and the third and fourth peripheral parts having overlapping regions that overlap each other, with the overlapping regions being entirely spaced apart from all of corners of the bottom part.

2. The display device according to claim 1, wherein the first and second peripheral parts have the overlapping regions at one or two locations, respectively.

3. A display device comprising:
a display portion;
a light source; and
a reflector that reflects light from the light source, the reflector having a rectangular bottom part, first and second peripheral parts that partially extend from first opposing sides of the bottom part, and third and fourth peripheral parts that extend from second opposing sides of the bottom part that are adjacent to the first opposing sides, the first and second peripheral parts and the third and fourth peripheral parts having overlapping regions that overlap each other, the first and second peripheral parts being located at middle portions of the first opposing sides.

4. The display device according to claim 1, wherein the first and second peripheral parts are located at end portions of the first opposing sides.

5. The display device according to claim 1, wherein at least one of the third and fourth peripheral parts extends from an entire portion of corresponding one of the second opposing sides.

6. The display device according to claim 5, wherein the third and fourth peripheral parts have first sections that extend from the second opposing sides, and second sections that extend from the first sections, the second sections overlap with the first and second peripheral parts.

7. The display device according to claim 1, wherein the third and fourth peripheral parts have first sections that extend from the second opposing sides, and second sections that extend from the first sections, the second sections overlap with the first and second peripheral parts.

8. The display device according to claim 7, wherein the second sections overlap with the bottom part.

9. The display device according to claim 7, wherein the second sections extend from both ends of each of the first sections.

10. A display device comprising:
a display portion;
a light source; and
a reflector that reflects light from the light source,
the reflector including a rectangular bottom portion and peripheral portions that extend from opposing sides of the bottom portion, respectively, the reflector having first overlapping regions in which parts of the reflector overlap with each other, with the first overlapping regions being disposed at the peripheral portions, respectively, with the first overlapping regions being entirely spaced apart from all of corners of the bottom portion.

11. The display device according to claim 10, wherein each of the first overlapping regions is disposed outward relative to corresponding one of the opposing sides.

12. The display device according to claim 10, wherein the first overlapping regions are disposed at two locations for each of the peripheral portions.

13. The display device according to claim 12, wherein the two locations are spaced apart from each other along corresponding one of the opposing sides.

14. The display device according to claim 10, wherein the reflector further having second overlapping regions in which parts of the reflector overlap with each other, with the second overlapping regions being disposed at the bottom portion.

15. The display device according to claim 14, wherein the second overlapping regions extend along the opposing sides, respectively.

16. The display device according to claim 15, wherein the second overlapping regions extend from the corners of the bottom portion, respectively.

17. The display device according to claim 14, wherein the second overlapping regions are disposed at two locations for each of the opposing sides.

18. The display device according to claim 17, wherein the two locations are spaced apart from each other along corresponding one of the opposing sides.

19. The display device according to claim 10, wherein the first overlapping regions have a triangular shape.

20. The display device according to claim 14, wherein the second overlapping regions have a triangular shape.

* * * * *